US010991344B2

(12) United States Patent
Ogawa et al.

(10) Patent No.: US 10,991,344 B2
(45) Date of Patent: Apr. 27, 2021

(54) DISPLAY CONTROLLER, DISPLAY CONTROL SYSTEM, ELECTRO-OPTICAL DEVICE, ELECTRONIC APPARATUS, AND MOBILE UNIT

(71) Applicant: SEIKO EPSON CORPORATION, Tokyo (JP)

(72) Inventors: Hideki Ogawa, Fujimi-machi (JP); Akihiko Ito, Tatsuno-machi (JP); Masahiko Miura, Chino (JP); Motoaki Nishimura, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/663,434

(22) Filed: Oct. 25, 2019

(65) Prior Publication Data

US 2020/0135153 A1 Apr. 30, 2020

(30) Foreign Application Priority Data

Oct. 26, 2018 (JP) ............................ JP2018-202039

(51) Int. Cl.

| | |
|---|---|
| ***G06F 3/038*** | (2013.01) |
| ***G09G 5/00*** | (2006.01) |
| ***G09G 5/38*** | (2006.01) |
| ***G09G 3/20*** | (2006.01) |
| ***G09G 5/14*** | (2006.01) |

(52) U.S. Cl.

CPC ................ *G09G 5/38* (2013.01); *G09G 3/20* (2013.01); *G09G 5/14* (2013.01); *G09G 2320/0613* (2013.01); *G09G 2330/12* (2013.01); *G09G 2340/14* (2013.01); *G09G 2360/04* (2013.01); *G09G 2380/10* (2013.01)

(58) Field of Classification Search

CPC .................................................... G06F 3/0488

See application file for complete search history.

(56) References Cited

U.S. PATENT DOCUMENTS

| | | | | |
|---|---|---|---|---|
| 7,852,202 | B2 | 12/2010 | Miake et al. | |
| 8,847,941 | B2 | 9/2014 | Tanaka et al. | |
| 2002/0093502 | A1 * | 7/2002 | Koyama | G09G 5/28 345/467 |

(Continued)

FOREIGN PATENT DOCUMENTS

| | | | |
|---|---|---|---|
| JP | 4303461 | B2 | 7/2009 |
| WO | 2007/037050 | A1 | 4/2007 |

(Continued)

*Primary Examiner* — Nan-Ying Yang

(74) *Attorney, Agent, or Firm* — Oliff PLC

(57) ABSTRACT

A display controller 100 includes an interface circuit 120 that receives abnormal display line detection information from a display driver 300 that drives an electro-optical panel 460, and a processing circuit 130 that controls the display driver 300. The processing circuit 130 performs determination on an abnormal display area based on the abnormal display line detection information. If a specific display pattern is displayed in the abnormal display area, the processing circuit 130 outputs, via the interface circuit 120, image data for displaying the specific display pattern in a destination display area that is a display area different from the abnormal display area.

13 Claims, 15 Drawing Sheets

(56) References Cited

U.S. PATENT DOCUMENTS

| | | | | |
|---|---|---|---|---|
| 2011/0141079 | A1* | 6/2011 | Ito | G09G 3/20 345/207 |
| 2013/0275634 | A1* | 10/2013 | Kim | G06F 13/385 710/71 |
| 2016/0111042 | A1* | 4/2016 | Pyeon | G09G 3/3208 345/212 |
| 2019/0088219 | A1 | 3/2019 | Ito et al. | |

FOREIGN PATENT DOCUMENTS

| | | | |
|---|---|---|---|
| WO | 2010/038578 | A1 | 4/2010 |
| WO | 2017/150116 | A1 | 9/2017 |

* cited by examiner

| SL | 1 | 2 | 3 | 4 | 5 | ··· | 13 | 14 | 15 | 16 | 17 | ··· | 26 | 27 | 28 | 29 | 30 | ··· |
|---|---|---|---|---|---|---|---|---|---|---|---|---|---|---|---|---|---|---|
| DATA | 0 | 0 | 0 | 0 | 0 | ··· | 0 | 0 | 1 | 0 | 0 | ··· | 0 | 0 | 1 | 0 | 0 | ··· |

| SL | 1～16 | 17～32 | 33～48 | 49～64 | ··· |
|---|---|---|---|---|---|
| DATA | 1 | 1 | 1 | 0 | ··· |

DISPLAY CONTROLLER, DISPLAY CONTROL SYSTEM, ELECTRO-OPTICAL DEVICE, ELECTRONIC APPARATUS, AND MOBILE UNIT

The present application is based on, and claims priority from JP Application Serial Number 2018-202039, filed Oct. 26, 2018, the disclosure of which is hereby incorporated by reference herein in its entirety.

BACKGROUND

1. Technical Field

The present invention relates to a display controller, a display control system, an electro-optical device, an electronic apparatus, a mobile unit, and the like.

2. Related Art

In display control of display devices, a processing device such as a CPU transmits image data and a control signal to a display controller, and the display controller performs image processing and generates a timing signal. A display driver then drives an electro-optical panel based on the image data that underwent the image processing and the timing signal.

Patent Document 1 discloses a technique for dealing with a display abnormality in a display device. In Patent Document 1, a source driver IC is a display driver, and a liquid crystal display unit is an electro-optical panel. In Patent Document 1, three source drivers IC drive one liquid crystal display unit, and the presence or absence of an abnormality in each of the source drivers IC is detected. If an abnormality is detected in a source driver IC, the display operation of the source driver IC is stopped, and the entire display area that is driven by the source driver IC is displayed in black or white.

International Publication No. 2010/038578 is an example of the related art.

In the above known technique, a display operation of a display driver in which an abnormality was detected is stopped, and display is disabled in the entire display area that is driven by the display driver. Therefore, when there is an actual abnormality only in a portion of the display area that is driven by the display driver in which the abnormality was detected, there is the issue that the remaining normal display area cannot be used. In other words, there is an issue that content that is actually displayed in the abnormal display area, out of the display area that is driven by the display driver, cannot be displayed using the remaining normal display area

SUMMARY

One aspect of the present disclosure pertains to a display controller that includes an interface circuit that receives abnormal display line detection information from a display driver that drives an electro-optical panel, and a processing circuit that controls the display driver, and the processing circuit performs determination on an abnormal display area based on the abnormal display line detection information, and if a specific display pattern is displayed in the abnormal display area, outputs, via the interface circuit, image data for displaying the specific display pattern in a destination display area that is a display area different from the abnormal display area.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Preferred embodiments of the disclosure will be described below in detail. It is to be noted that the embodiments described below are not intended to unduly limit the scope of the disclosure recited in the appended claims, and not all configurations described in the embodiments are necessarily essential to the solving means of the disclosure.

1. Configuration

Figure 1:
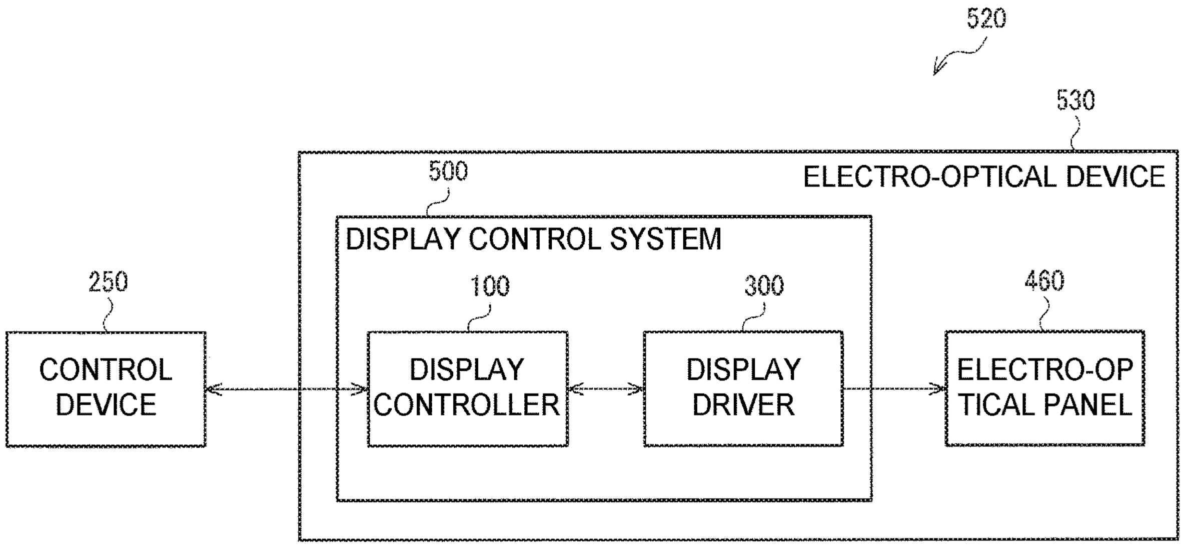
FIG. 1 shows a configuration example of a display system that includes a display controller.

FIG. 1 is a configuration example of a display system 520 that includes a display controller 100. The display system 520 includes a control device 250, an electro-optical device 530, and a display control system 500. The electro-optical device 530 includes the display control system 500 and an electro-optical panel 460. The display control system 500 includes the display controller 100 and a display driver 300.

An on-vehicle display system can be envisioned as the display system 520. The electro-optical panel 460 is a cluster panel provided in front of a driver's seat, for example. Various pieces of information that are presented to a driver are displayed on the cluster panel. For example, meters, icons that inform the driver of the state of the automobile, a display that informs the driver of the in-vehicle temperature, and the like can be envisioned as the information displayed on the cluster panel. The display content can be envisioned as a specific display pattern, which will be described later.

Note that application of the display system 520 is not limited thereto, and the display system 520 can be applied to various electronic apparatuses such as a projector, a television device, an information processing device, and a mobile information terminal. In addition, various display content that is displayed on the display of any of these electronic apparatuses can be defined as a specific display pattern.

The control device 250 transmits image data to the display controller 100. The display controller 100 receives image data from the control device 250, and processes the image data. The display controller 100 outputs the processed image data and a timing control signal to the display driver 300. The timing control signal is a horizontal synchronization signal, a vertical synchronization signal, a pixel clock signal, or the like. The display driver 300 receives the image data and timing control signal from the display controller 100, and drives the electro-optical panel 460 based on the image data and timing control signal. Accordingly, an image corresponding to the image data is displayed on the electro-optical panel 460.

The control device 250 is a processor such as a CPU (Central Processing Unit), a microcomputer, or the like. Alternatively, the control device 250 may also be constituted by a plurality of circuit components mounted on a circuit substrate. The display controller 100 is an integrated circuit device. The display driver 300 is a data line driver or a scanning line driver. The data line driver is an integrated circuit device. The scanning line driver is an integrated circuit device or a circuit formed on a glass substrate of the electro-optical panel 460. The display driver 300 may have a configuration in which a data line driver and a scanning line driver are combined into one integrated circuit device. The electro-optical panel 460 is a matrix-type liquid crystal display panel or an EL (Electro Luminescence) panel, for example.

In this embodiment, the display driver 300 detects an abnormal display line, and transmits the detection result to the display controller 100. The display controller 100 performs processing for moving a specific display pattern to a normal display area, based on the received abnormal display line detection information. The abnormal display line is a data line on which a display abnormality has been detected from among the data lines of the electro-optical panel 460, or a scanning line on which a display abnormality has been detected from among the scanning lines of the electro-optical panel 460. The specific display pattern is a display pattern that is to be moved when an abnormal display line is detected, from among content that is displayed on the electro-optical panel 460. In other words, content displayed on the electro-optical panel 460 includes content that is to be moved from an abnormal display area to a normal display area and content that is not to be moved. From among the content, the content that is moved from the abnormal display area to the normal display area is a specific display pattern. This embodiment will be described below in detail.

Figure 2:
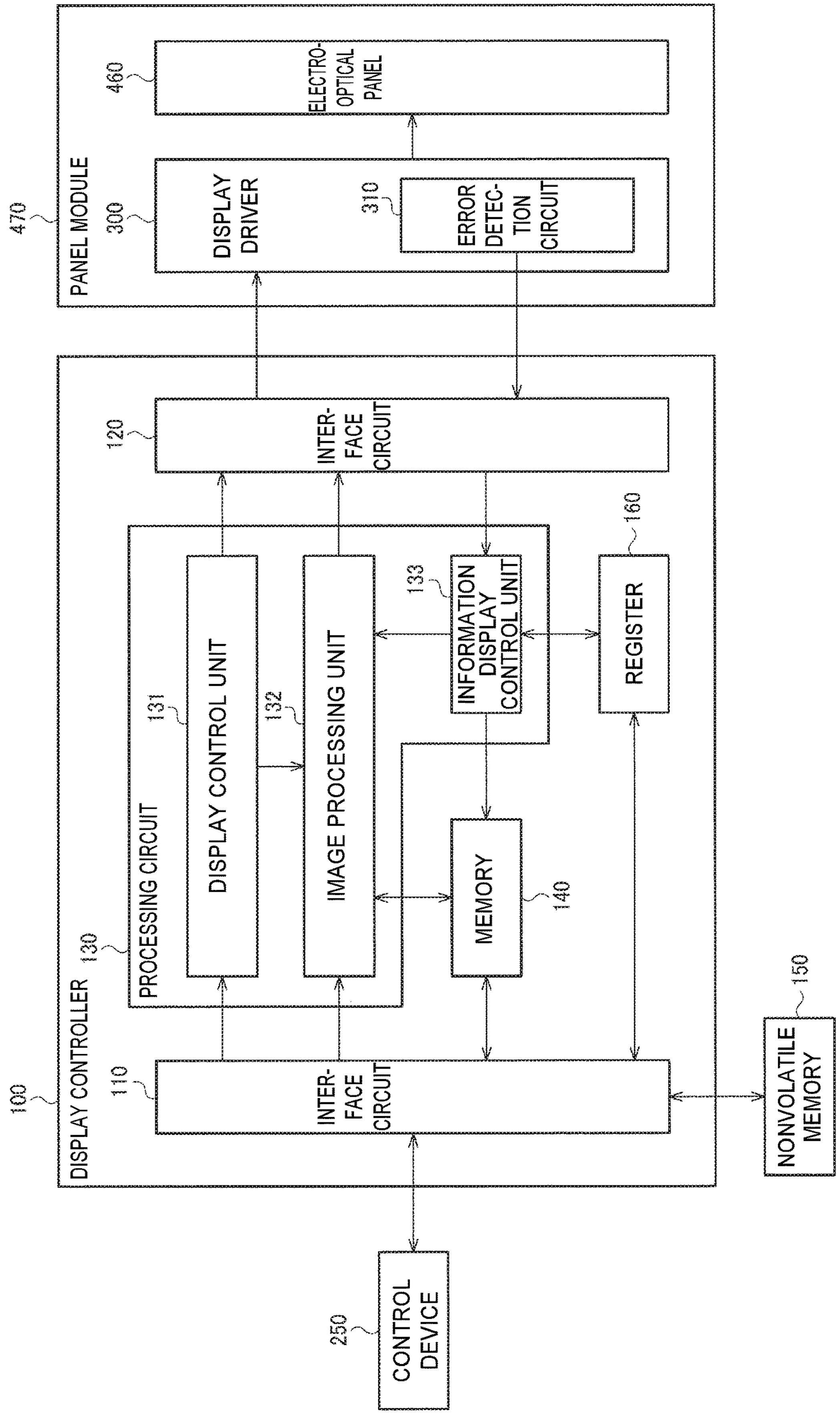
FIG. 2 shows a configuration example of the display controller and a first detailed configuration example of the display system.

FIG. 2 shows a configuration example of the display controller 100 and a first detailed configuration example of the display system 520. In FIG. 2, a panel module 470 is constituted by the display driver 300 and the electro-optical panel 460. In addition, the display system 520 may further include a nonvolatile memory 150. Note that, as will be described later, the nonvolatile memory 150 may be omitted.

The electro-optical panel 460 includes, for example, a substrate such as a glass substrate, a pixel array provided on the substrate, and data lines and scanning lines connected to the pixel array. The data lines and scanning lines are ITO (Indium Tin Oxide) interconnects provided on the substrate, for example. The panel module 470 is configured by an integrated circuit device, which is the display driver 300, being mounted on this substrate of the electro-optical panel 460. The display controller 100 and the nonvolatile memory 150 are mounted on a circuit substrate, for example. The display system 520 is configured by the circuit substrate and the panel module 470 being connected by a flexible substrate, a cable, or the like, and the circuit substrate and the control device 250 being connected by a flexible substrate, a cable, or the like.

The display controller 100 includes an interface circuit 110, an interface circuit 120, a processing circuit 130, a memory 140, and a register 160. The display driver 300 includes an error detection circuit 310.

The error detection circuit 310 detects an abnormal display line of the electro-optical panel 460. The display driver 300 outputs information regarding the abnormal display line detected by the error detection circuit 310, as abnormal display line detection information to the display controller 100.

The interface circuit 120 performs communication between the display controller 100 and the display driver 300. Specifically, the interface circuit 120 transmits, to the display driver 300, image data and a timing control signal that are output by the processing circuit 130. Also, the interface circuit 120 receives abnormal display line detection information from the display driver 300, and outputs the abnormal display line detection information to the processing circuit 130.

For example, LVDS (Low Voltage Differential Signal), RGB serial, or a transmission scheme of a display port standard can be adopted as a communication scheme for the image data and timing control signal. In addition, I2C (Inter Integrated Circuit), SPI (Serial Peripheral Interface), or the like can be adopted as a communication scheme for the abnormal display line detection information and the like. The interface circuit 120 can include an input/output buffer circuit and a control circuit that that realize these communication schemes.

The interface circuit 110 performs communication between circuits of the control device 250 and the display controller 100. Specifically, the interface circuit 110 receives image data and a timing control signal from the control device 250, outputs the image data to the processing circuit 130 and the memory 140, and outputs the timing control signal to the processing circuit 130. The timing control signal is a clock signal, a vertical synchronization signal, a horizontal synchronization signal, a data enable signal, or the like. In addition, the interface circuit 110 receives, from the control device 250, display pattern designation data for designating an area in which a specific display pattern is to be displayed, and stores the display pattern designation data in the register 160. In addition, the interface circuit 110 outputs error detection information to the control device 250. For example, as will be described later, when the processing circuit 130 detects an abnormal display area, the error detection information is stored in the register 160. The interface circuit 110 outputs the error detection information stored in the register 160, to the control device 250. A scheme similar to that of the interface circuit 120 can be adopted as a communication scheme of the interface circuit 110.

The memory 140 is an image memory that stores image data received from the interface circuit 110. The memory 140 is a semiconductor memory such as an SRAM or DRAM.

The processing circuit 130 controls a display driver. Specifically, the processing circuit 130 outputs image data and a timing control signal to the display driver 300 via the interface circuit 120. The processing circuit 130 includes a display control unit 131, an image processing unit 132, and an information display control unit 133.

The display control unit 131 generates a timing control signal for the display driver 300 based on a timing control signal received from the control device 250 via the interface circuit 110. The display control unit 131 outputs the generated timing control signal to the display driver 300 via the interface circuit 120.

The information display control unit 133 determines an abnormal display area based on abnormal display line detection information received from the display driver 300 via the interface circuit 120. The information display control unit 133 then determines whether or not to move a specific display pattern, based on display pattern designation data stored in the register 160 and the determination result of the abnormal display area, and outputs the determination result to the image processing unit 132. In other words, if a specific display pattern is displayed in the abnormal display area, the information display control unit 133 determines to move the specific display pattern.

The image processing unit 132 performs image processing on image data received from the control device 250 via the interface circuit 110. The image processing unit 132 outputs the processed image data to the display driver 300 via the interface circuit 120. If the information display control unit 133 determines to move a specific display pattern, the image processing unit 132 performs image processing for moving the specific display pattern to a destination display area. Specifically, the image processing unit 132 reads out the image data of the specific display pattern from the memory 140, and rewrites the image data of the destination display area with the image data of the specific display pattern. Note that the image data of the specific display pattern may also be stored in the nonvolatile memory 150. The image processing unit 132 may also read out the image data of the specific display pattern from the nonvolatile memory 150 via the interface circuit 110, and rewrite the image data of the destination display area with the image data of the specific display pattern. If the image processing unit 132 reads out image data of a specific display pattern from the memory 140, the nonvolatile memory 150 may be omitted.

Here, the destination display area is a display area different from an abnormal display area, and is a normal display area, for example. As will be described later, a configuration may also be adopted in which, even if there is an abnormal display line in the destination display area, the destination display area is recognized as a normal display area if it is within an allowable range, and a specific display pattern is moved to the destination display area. The destination display area is designated using register values, for example. Specifically, the control device 250 writes destination designation data for designating a destination display area, in the register 160 via the interface circuit 110. The information display control unit 133 gives an instruction regarding the destination display area to the image processing unit 132 based on the destination designation data read out from the register 160.

The processing circuit 130 is constituted by a logic circuit. The logic circuit is, for example, a gate array circuit or a standard cell array circuit. As used herein, the gate array circuit refers to an array circuit in which logic cells are automatically placed and signal lines are automatically routed. Also, in a standard cell array circuit, the logic cells are standardized cells. The standard cell array circuit refers to an array circuit in which signal lines are automatically routed in a logic cell array. The units of the processing circuit 130 may also be configured as individual logic circuits. Alternatively, a configuration may also be adopted in which the processing circuit 130 is a processor such as a DSP (Digital Signal Processor), and functions of the units of the processing circuit 130 are realized by the processor executing a program or the like in which the functions of the units of the processing circuit 130 are written.

Note that the configuration of the display system 520 is not limited to the configuration in FIG. 2. As an example, FIG. 3 shows a second detailed configuration example of the display system 520, and FIG. 4 shows a third detailed configuration example of the display system 520.

Figure 3:
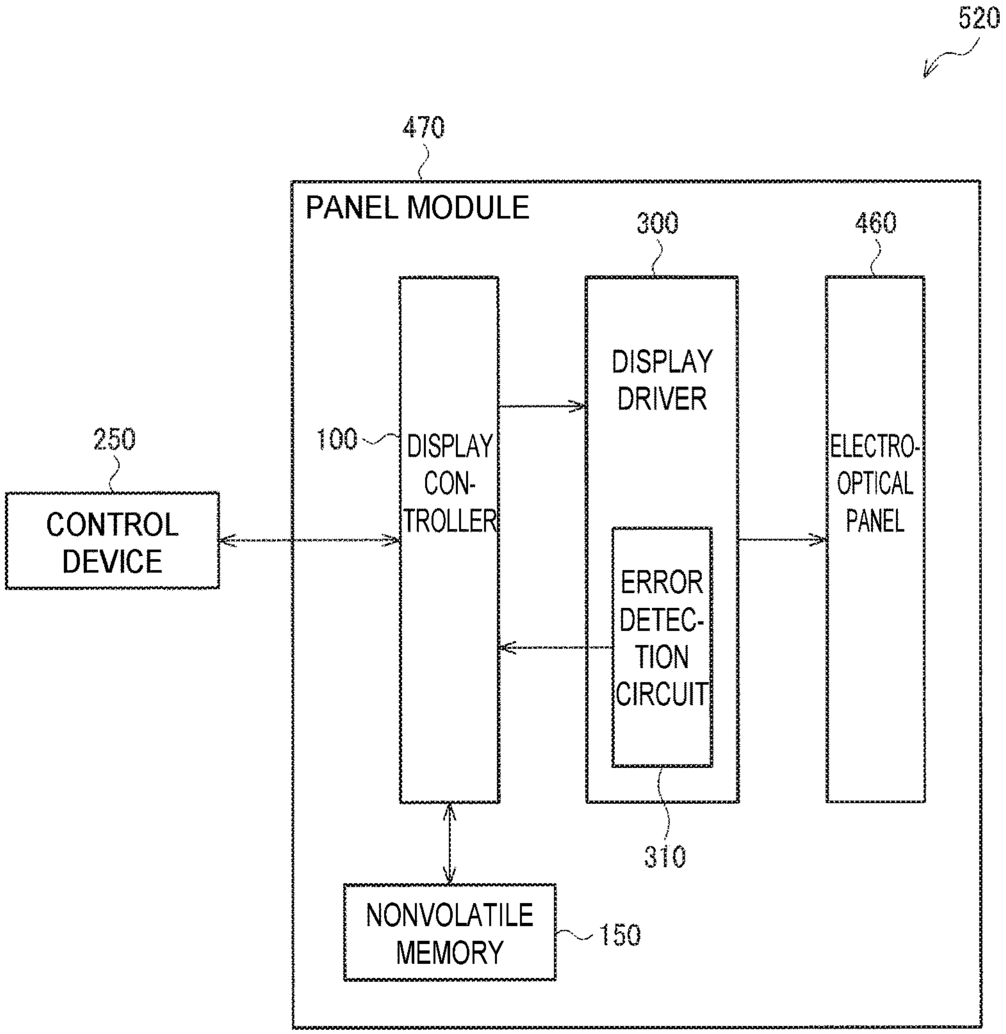
FIG. 3 shows a second detailed configuration example of the display system.

In the configuration example in FIG. 3, the panel module 470 includes the display controller 100, the display driver 300, the electro-optical panel 460, and the nonvolatile memory 150. Similarly to FIG. 2, the display controller 100 and the nonvolatile memory 150 are mounted on a circuit substrate, the display driver 300 is mounted on the substrate of the electro-optical panel 460, and the circuit substrate and the substrate of the electro-optical panel 460 are connected by a flexible substrate, a cable, or the like. In this configuration example, the panel module 470 is configurated by the circuit substrate and the substrate of the electro-optical panel 460 being connected by a flexible substrate, a cable, or the like. Also, the display system 520 is configurated by the panel module 470 and the control device 250 being connected by a flexible substrate, a cable, or the like.

Figure 4:
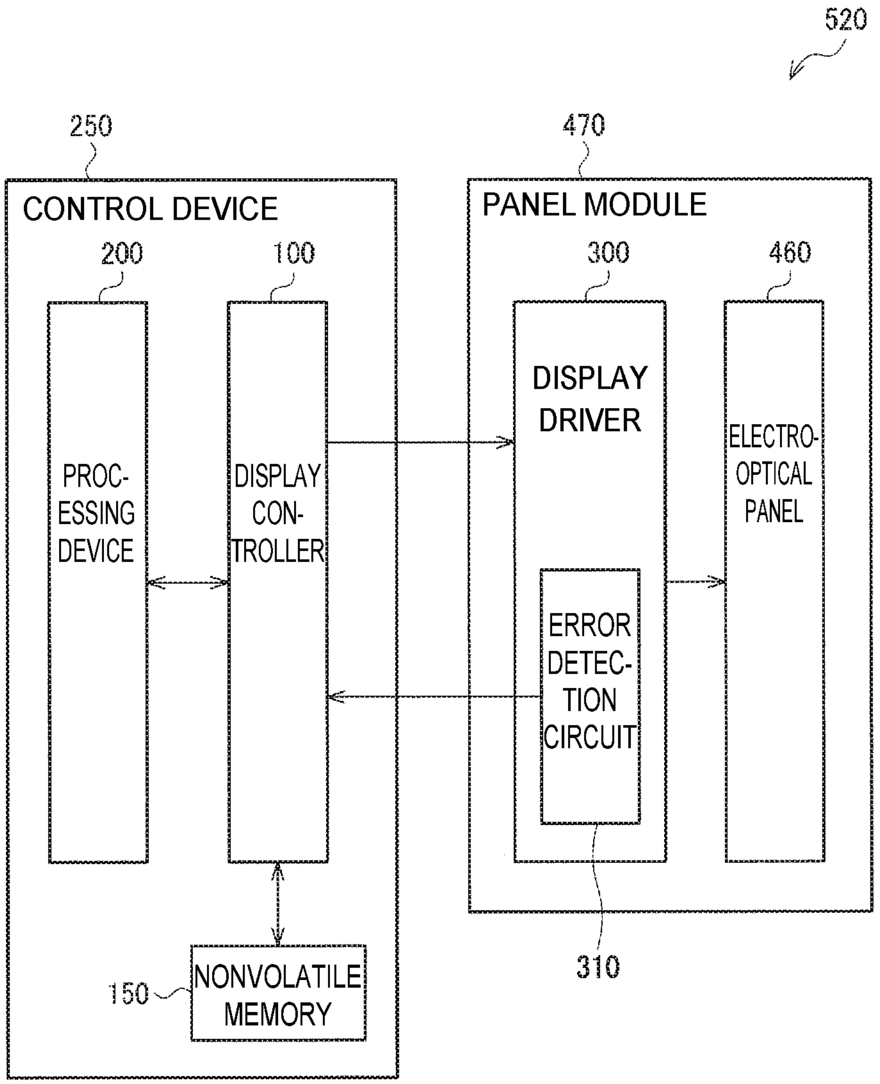
FIG. 4 shows a third detailed configuration example of the display system.

In the configuration example in FIG. 4, the control device 250 includes a processing device 200, the display controller 100, and the nonvolatile memory 150. Specifically, the control device 250 is configurated by the processing device 200, the display controller 100, and the nonvolatile memory 150 being mounted on a circuit substrate. Also, the display system 520 is configurated by the control device 250 and the panel module 470 being connected by a flexible substrate, a cable, or the like.

2. Operations

Figures 5, 6, 7:
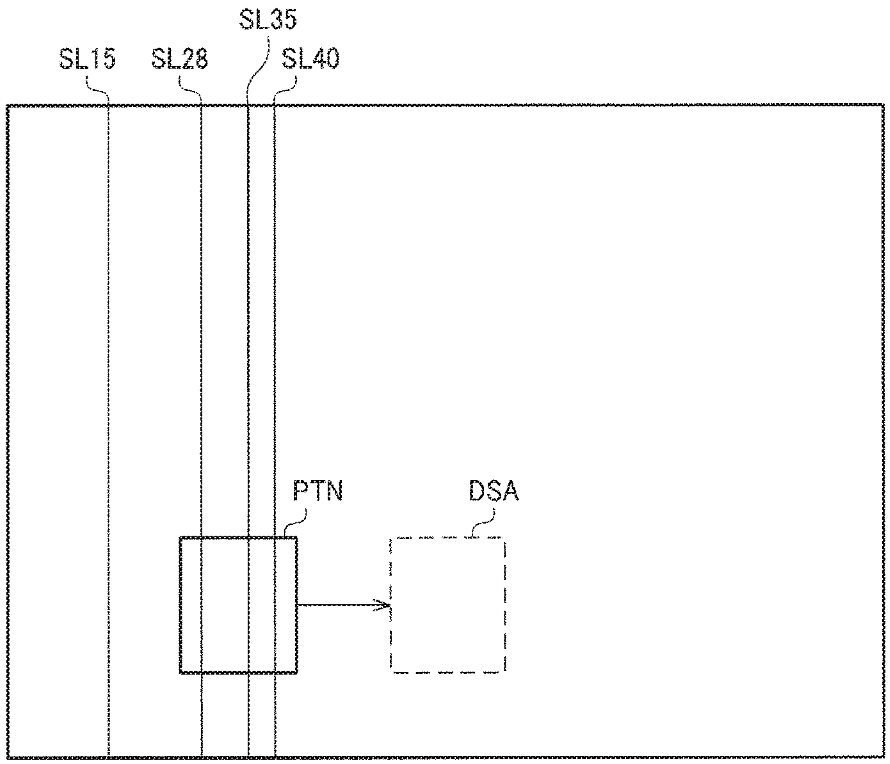
FIG. 5 is a diagram illustrating operations of the display controller.
FIG. 6 shows a first example of abnormal display line detection information that is output by an error detection circuit.
FIG. 7 shows a second example of abnormal display line detection information that is output by the error detection circuit.

Next, operations of the display controller 100 when moving a specific display pattern will be described. FIG. 5 is a diagram illustrating operations of the display controller 100. FIG. 5 schematically shows the entire display area of the electro-optical panel 460. Note that, in FIG. 5, operations of the display controller 100 when a data line that is an abnormal display line is detected will be described, but operations of the display controller 100 when a scanning line that is an abnormal display line is detected are similar.

In FIG. 5, each data line is denoted by SLx. "x" is an integer of 1 or larger, and increases sequentially along the horizontal scanning direction. SL15, SL28, SL35, and SL40 indicated as solid lines are abnormal display lines detected by the error detection circuit 310 of the display driver 300. FIG. 6 shows a first example of abnormal display line detection information that is output by the error detection circuit 310. "DATA" is abnormal display line detection information. In this example, 1 bit corresponds to one data line. The number of bits of an abnormal display line is "1", and the number of bits of a line on which no abnormality has been found is "0".

The information display control unit 133 of the display controller 100 determines abnormal display lines based on abnormal display line detection information. In the examples in FIGS. 5 and 6, abnormal display lines are SL15, SL28, SL35, and SL40. The information display control unit 133 compares the positions of the abnormal display lines with the area of a specific display pattern PTN, and determines whether or not the specific display pattern PTN and the abnormal display lines overlap. In the example in FIG. 5, SL28, SL35, and SL40 overlap the specific display pattern PTN. For example, if the specific display pattern PTN is displayed in the range of SL20 to SL50 in the horizontal scanning direction, the information display control unit 133 determines, based on the range, that SL28, SL35, and SL40, which are abnormal display lines, overlap the specific display pattern PTN.

The information display control unit 133 determines whether or not to move the specific display pattern PTN to a destination display area DSA, based on the determination result on whether or not the specific display pattern PTN and the abnormal display lines overlap. In other words, when the specific display pattern PTN and abnormal display lines overlap, the information display control unit 133 determines to move the specific display pattern PTN to the destination display area DSA. Alternatively, when the number of abnormal display lines that overlap the specific display pattern PTN is larger than or equal to a threshold value, the information display control unit 133 determines to move the specific display pattern PTN to the destination display area DSA.

In the above example, the abnormal display area is abnormal display lines themselves. Note that the abnormal display area is not limited thereto.

For example, the information display control unit 133 determines, as an abnormal display area, the range from SL15 in which x is smallest to SL40 in which x is largest in FIG. 5. Then, by comparing the range of SL15 to SL40, which is an abnormal display area, with the range of SL20 to SL50 in which the specific display pattern PTN is displayed, the information display control unit 133 determines whether or not the specific display pattern PTN and the abnormal display area overlap.

Alternatively, the error detection circuit 310 of the display driver 300 may detect whether or not there is an abnormal display line in each line group. FIG. 7 shows a second example of abnormal display line detection information that is output by the error detection circuit 310. In the example in FIG. 7, 16 data lines form one line group. In FIG. 7, abnormal display lines are SL15, SL28, SL35, and SL40, and thus “1” bit corresponds to line groups of SL1 to SL16, SL17 to SL32, and SL33 to SL48. In this example, the area of data line groups each corresponding to “1” bit is an abnormal display area. In other words, the range of SL1 to SL48 is an abnormal display area. By comparing the range of SL1 to SL48, which is an abnormal display area, with the range of SL20 to SL50 in which the specific display pattern PTN is displayed, the information display control unit 133 determines whether or not the specific display pattern PTN and the abnormal display area overlap.

As described with reference to FIG. 2, an area in which a specific display pattern is displayed is designated according to display pattern designation data stored in the register 160. In the above-described example, the range of data lines in the horizontal scanning direction, namely data for designating SL20 to SL50, is the display pattern designation data. Note that the display pattern designation data is not limited thereto.

For example, during processing for detecting a scanning line that is an abnormal display line, data for designating the range of scanning lines in the vertical scanning direction is display pattern designation data. In addition, the display pattern designation data may also be data for designating a two-dimensional area. For example, the display pattern designation data may be data in which two pixel positions are designated. In this case, a rectangular area in which a line connecting the two pixel positions is a diagonal line is an area in which the display pattern PTN is displayed.

In addition, in the above example, a case has been described in which the specific display pattern PTN is an image of a rectangular area, as an example. For example, when an icon, mark, or the like is displayed as the specific display pattern PTN, the image of a rectangular area that includes the icon or mark is the specific display pattern PTN. Note that the specific display pattern PTN is not limited thereto.

For example, the specific display pattern PTN may also be an image itself that has a specific shape. For example, when an icon, mark, or the like is displayed as the specific display pattern PTN, the icon or mark itself may be the specific display pattern PTN. Also in this case, as described above, the range of data lines in the horizontal scanning direction or the range of scanning lines in the vertical scanning direction is display pattern designation data.

According to the above embodiment, the processing circuit 130 determines an abnormal display area based on abnormal display line detection information. Then, if the specific display pattern PTN is displayed in the abnormal display area, the processing circuit 130 outputs, via the interface circuit 120, image data for displaying the specific display pattern PTN in the destination display area DSA.

With such a configuration, in a display area that is driven by one display driver 300, the specific display pattern PTN can be moved from an abnormal display area to a normal display area. In other words, if a portion of a display area that is driven by one display driver 300 is abnormal, the remaining normal display area can be used.

3. Various Embodiments

Various embodiments of the display system 520 that includes the display controller 100 are described below. Note that a plurality of embodiments to be described below may be combined as appropriate. For example, an embodiment in which an abnormal display line is an abnormal data line and an embodiment in which an abnormal display line is an abnormal scanning line may be combined.

Figure 8:
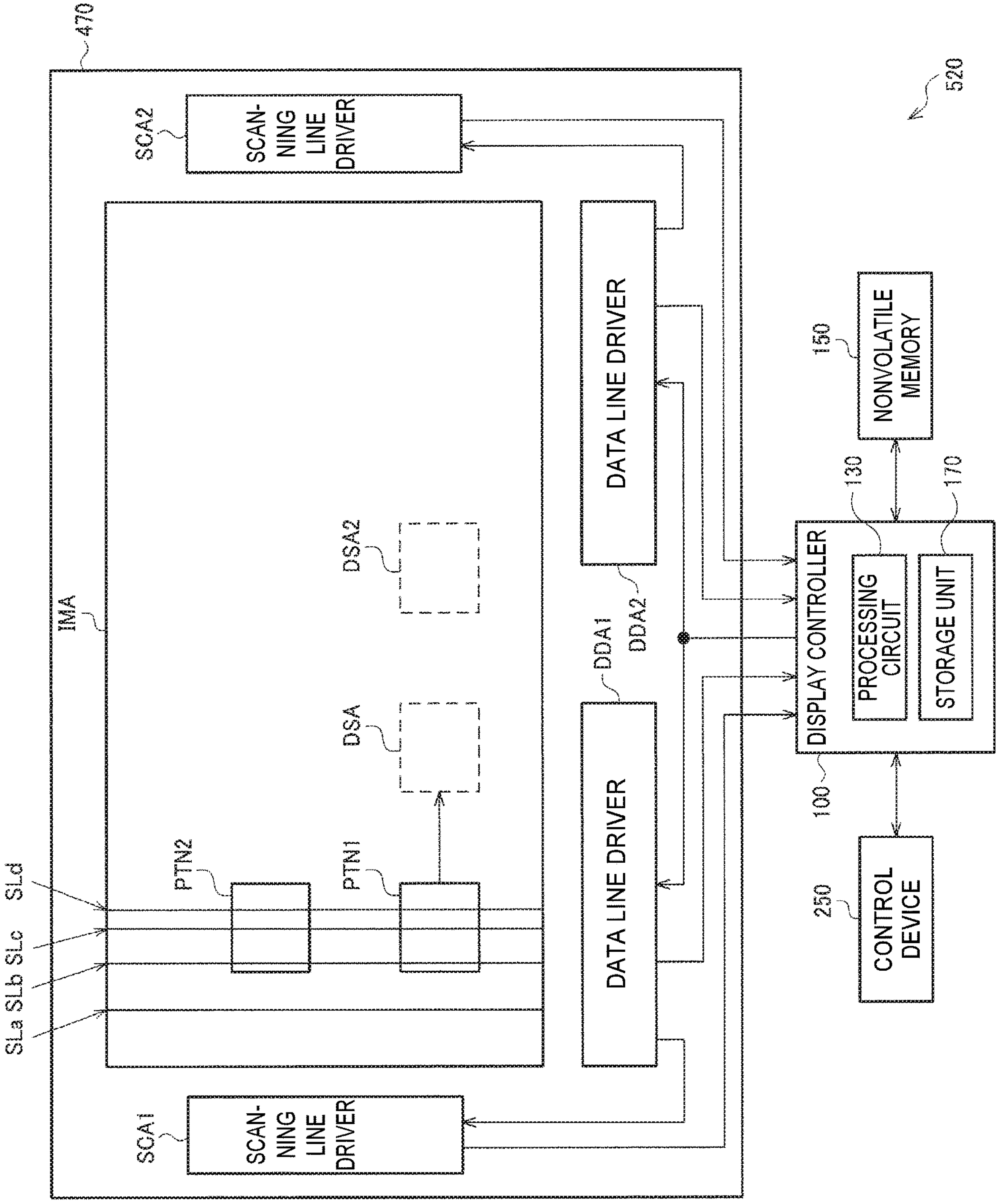
FIG. 8 is a diagram illustrating a first embodiment.
Figure 9:
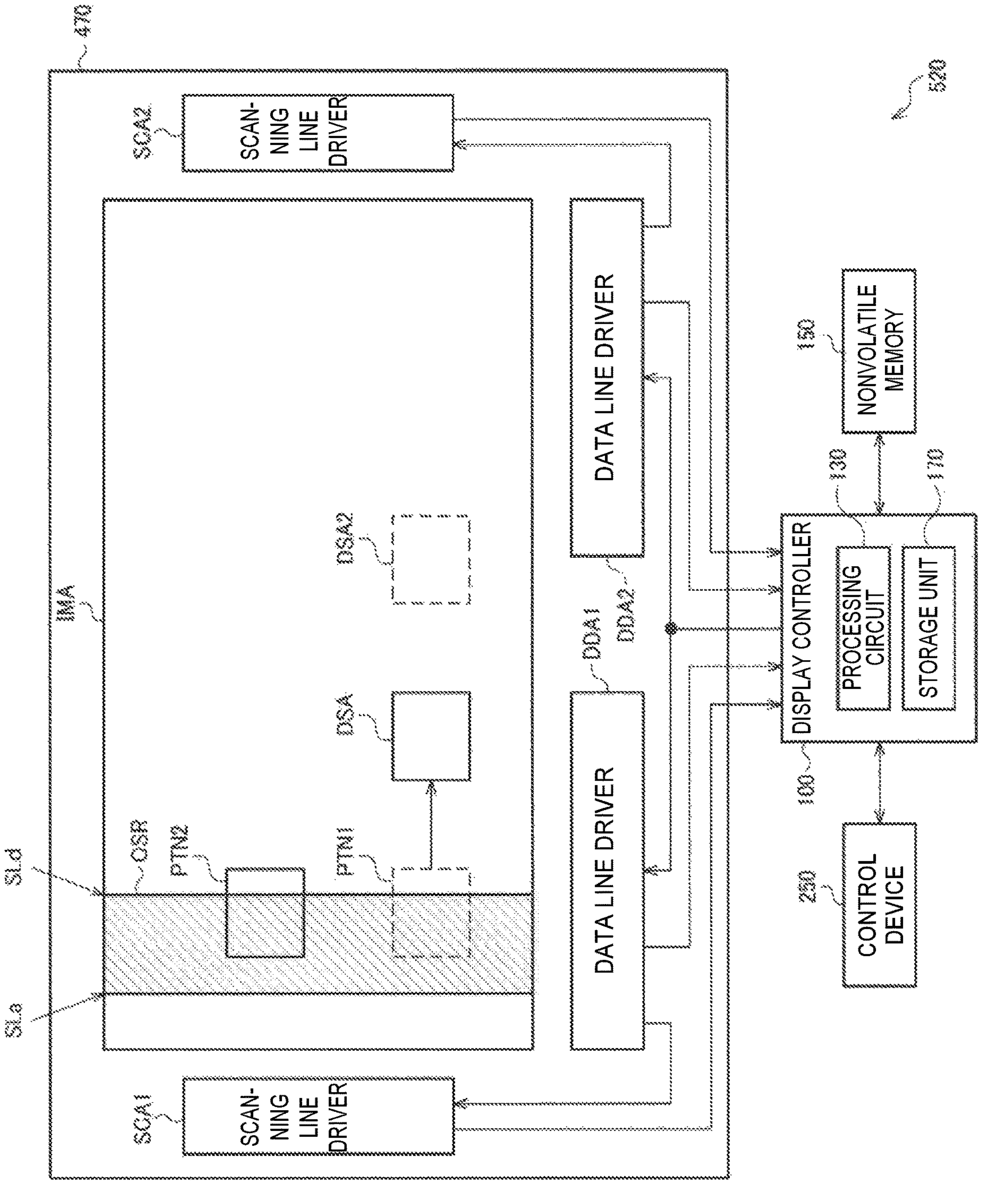
FIG. 9 is a diagram illustrating the first embodiment.

FIGS. 8 and 9 are diagrams illustrating a first embodiment. The panel module 470 includes data line drivers DDA1 and DDA2 and scanning line drivers SCA1 and SCA2. IMA denotes the display area of the electro-optical panel. Hereinafter, the horizontal scanning direction in the display area IMA is referred to as “right”, and the vertical scanning direction is referred to as “downward”.

The data line driver DDA1 drives the left half of the display area IMA, and the data line driver DDA2 drives the right half of the display area IMA. The scanning line driver SCA1 drives the upper half of the display area IMA, and the scanning line driver SCA2 drives the lower half of the display area IMA. Each of the data line drivers DDA1 and DDA2 and the scanning line drivers SCA1 and SCA2 corresponds to the display driver 300 in FIG. 2. In the first embodiment, a display pattern PTN1, which is a first specific display pattern, and a display pattern PTN2, which is a second specific display pattern, are displayed in the left half of the display area IMA that is driven by the data line driver DDA1. In addition, in the first embodiment, an abnormal display line is an abnormal data line.

In FIG. 8, the data line driver DDA1 has detected that data lines Sla, SLb, SLc, and SLd are abnormal display lines. The processing circuit 130 of the display controller 100 determines the number of abnormal display lines based on abnormal display line detection information. Specifically, the processing circuit 130 determines the number of abnormal display lines that overlap the display pattern PTN1. In FIG. 8, the number of such abnormal display lines is three. The processing circuit 130 determines whether or not to display the display pattern PTN1 in the destination display area DSA, based on the determination result regarding the number of abnormal display lines.

More specifically, the display controller 100 includes a storage unit 170 that stores a first threshold value for determining an abnormal display area. The storage unit 170 corresponds to the register 160 in FIG. 2. Alternatively, the storage unit 170 may be a semiconductor memory such as a RAM, ROM, or nonvolatile memory. The number of abnormal display lines that overlap the display pattern PTN1 is denoted by N1, and the first threshold value is denoted by Th1. The processing circuit 130 determines whether or not N1>Th1. If N1>Th1, the processing circuit 130 determines to display the display pattern PTN1 in the destination display area DSA.

As shown in FIG. 9, the processing circuit 130 sets a suspend display area OSR to display an abnormal display area in white, black, or a specific color. The suspend display area OSR is the area of the range of the data lines SLa to SLd. Note that the suspend display area OSR is not limited thereto, and the suspend display area OSR may be any area that includes an abnormal display area. For example, as described with reference to FIG. 7, if the presence or absence of an abnormal display line is determined for each data line group, an area that includes a data line group determined as including an abnormal display line is the suspend display area OSR that includes an abnormal display area. In FIG. 7, for example, the range of the data lines SL1 to SL48 is the suspend display area OSR. Note that, as will be described later, if the abnormal display area is an abnormal display line itself, the suspend display area OSR is not set.

According to this embodiment, if the number N1 of abnormal display lines that overlap the display pattern PTN1 is larger than the first threshold value Th1 that indicates an allowable range, the display pattern PTN1 is displayed in the destination display area DSA. Accordingly, the allowable range that indicates the number of abnormal display lines that are allowed to overlap the display pattern PTN1 can be set by setting the first threshold value Th1. In addition, as will be described later, the first threshold value Th1 can be set in association with the degree of importance of a display pattern.

In FIG. 8, SLb, SLc, and SLd, which are abnormal display lines, overlap the display pattern PTN2 as well. However, as shown in FIG. 9, the display pattern PTN2 is not moved.

Specifically, the storage unit 170 stores degree-of-importance information. The degree-of-importance information represents a first degree of importance, which is the degree of importance of the display pattern PTN1 and a second degree of importance, which is the degree of importance of the display pattern PTN2. The second degree of importance is lower than the first degree of importance. When the display pattern PTN1 is displayed in an abnormal display area, the processing circuit 130 determines whether or not to move the display pattern PTN1 to the destination display area DSA, based on the first degree of importance. Also, when the display pattern PTN2 is displayed in an abnormal display area, the processing circuit 130 determines whether or not to move the display pattern PTN2, based on the second degree of importance.

The degree of importance is an index for determining whether or not to display a display pattern of an icon, mark, or the like using a normal display area. The higher the degree of importance is, the more likely a determination is made to display the display pattern in the normal display area. For example, if the degree of importance is a binary value, if the degree of importance is high, a display pattern is moved to a destination display area, and, if the degree of importance is low, the display pattern is not moved. Alternatively, if the degree of importance is a ternary or higher value, the higher the degree of importance is, the smaller the above first threshold value Th1 is. In this embodiment, for example, a first threshold value Th11 of the display pattern PTN1 is set according to the first degree of importance, and a first threshold value Th12 of the display pattern PTN2 is set according to the second degree of importance. Here, Th12>Th11. When the relationship between the number N1 of abnormal display lines and these threshold values is N1>Th12>Th11, both the display pattern PTN1 and the display pattern PTN2 are moved to the destination display area. In addition, when Th12>N1>Th11, the display pattern PTN1 is displayed in the destination display area, and the display pattern PTN2 is not moved.

According to this embodiment, whether or not to move a display pattern from an abnormal display area to a destination display area can be determined according to the degree of importance of the display pattern. In other words, a display pattern with a high degree of importance can be moved from an abnormal display area to a destination display area.

As described above, in this embodiment, if the number N1 of abnormal display lines that overlap the display pattern PTN1 satisfies N1>Th1, the display pattern PTN1 is moved to the destination display area DSA. In this embodiment, furthermore, whether or not to display the display pattern PTN1 in the destination display area DSA may be determined based on the number of abnormal display lines that overlap the destination display area DSA.

Specifically, the storage unit 170 stores a second threshold value for determining whether or not to enable display in the destination display area DSA. The second threshold value is denoted by Th2. The processing circuit 130 determines the number of abnormal display lines that overlap the destination display area DSA, based on abnormal display line detection information. This number of abnormal display lines is denoted by N2. When N1>Th1, the processing circuit 130 determines whether or not N2≤Th2. If N2≤Th2, the processing circuit 130 determines to display the display pattern PTN1 in the destination display area DSA.

According to this embodiment, if abnormal display lines overlap the destination display area DSA, whether or not to display the display pattern PTN1 in the destination display area DSA can be determined based on the number of such abnormal display lines. The second threshold value Th2 indicates an allowable range in which the display pattern PTN1 is displayed in the destination display area DSA. If N2>Th2, the processing circuit 130 displays the display pattern PTN1, for example, in a second destination display area DSA2, which is different from the destination display area DSA. If abnormal display lines overlap the second destination display area DSA2, whether or not to move the display pattern PTN1 may be determined in accordance with the threshold value and the number of abnormal display lines, similarly to the destination display area DSA. Alternatively, if N2>Th2, the processing circuit 130 may cancel moving of the display pattern PTN1.

As described above, in this embodiment, the number N1 of abnormal display lines that overlap the display pattern PTN1 is determined. Note that there is no limitation thereto, and the processing circuit 130 may also determine whether or not to display the display pattern PTN1 in the destination display area DSA, based on the number of abnormal display lines in a specific area, which is a portion of the display pattern PTN1.

For example, assume that the display pattern PTN1 is a rectangular area, which includes an icon, mark, or the like. In this case, the area of the icon, mark, or the like in the rectangular area is the specific area. Alternatively, a portion of the area of the icon, mark, or the like may also be the specific area. For example, if the icon, mark, or the like can be identified by visually recognizing only a portion of its area, the portion of the area may be the specific area. Data for designating the specific area is stored in the storage unit 170.

According to this embodiment, if a portion that is important to visually recognizing the display pattern PTN1 overlaps an abnormal display line, the display pattern PTN1 can be displayed in the destination display area DSA.

Figure 10:
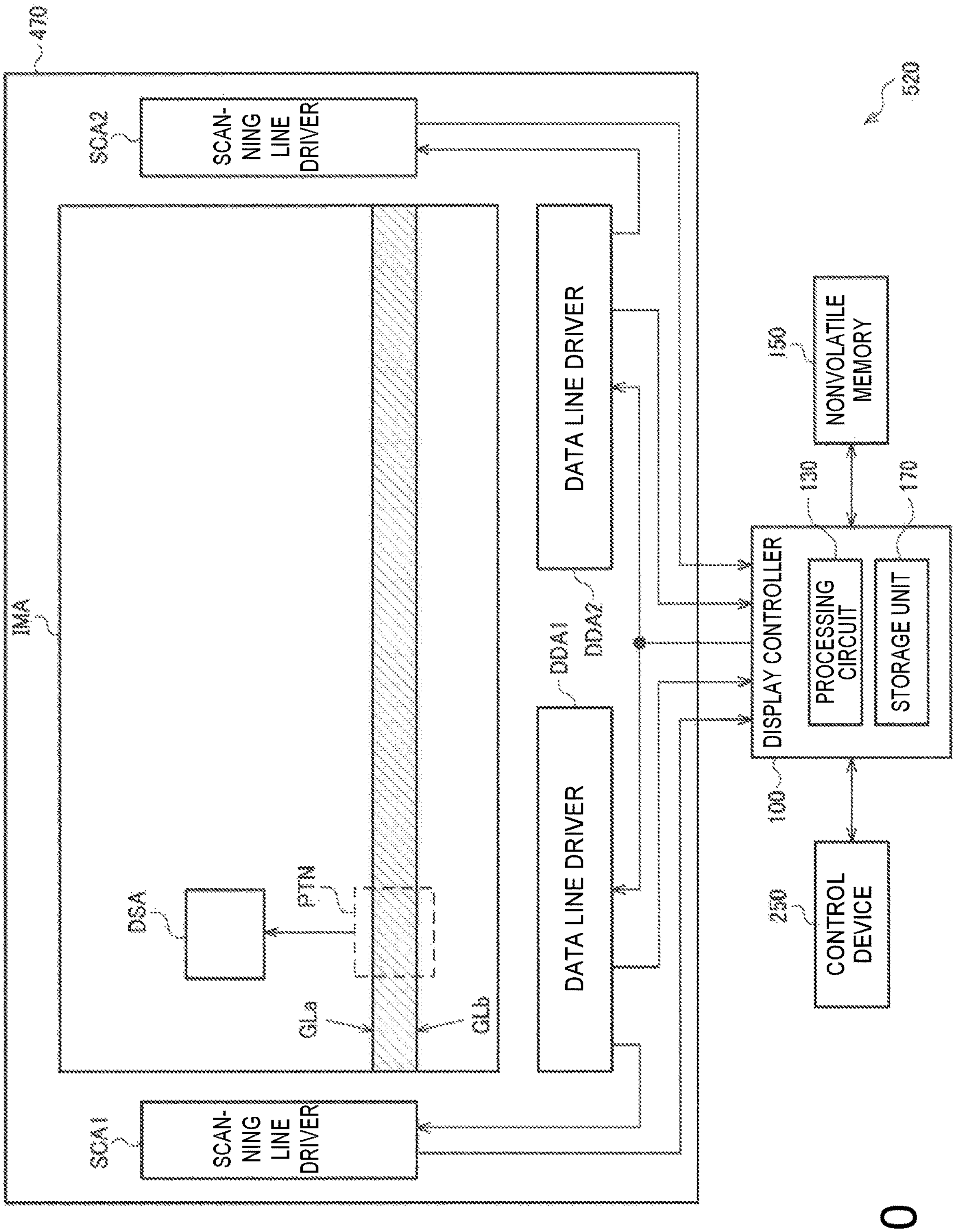
FIG. 10 is a diagram illustrating a second embodiment.

FIG. 10 is a diagram illustrating a second embodiment. In the second embodiment, an abnormal display line is an abnormal scanning line.

A technique in which the processing circuit 130 determines whether or not to move the specific display pattern PTN to the destination display area DSA is similar to the technique in the first embodiment. Accordingly, the storage unit 170 stores a third threshold value for determining an abnormal display area. The number of abnormal scanning lines that overlap the specific display pattern PTN is denoted by N3, and the third threshold value is denoted by Th3. The processing circuit 130 determines whether or not N3>Th3. If N3>Th3, the processing circuit 130 determines to display a specific display pattern PTN2 in the destination display area DSA. Note that the technique for determining whether or not to move a display pattern based on the degree of importance of the display pattern, and the like can be applied to the second embodiment similarly to the first embodiment.

In FIG. 10, GLa and GLb are abnormal scanning lines. Further abnormal scanning lines may also be included between GLa and GLb. In that case, out of the plurality of abnormal scanning lines, the uppermost abnormal scanning line is GLa, and the lowest abnormal scanning line is GLb. The processing circuit 130 sets the abnormal display area of the range of GLa to GLb to be displayed in white, black or a specific color, as a suspend display area. Note that, similarly to the first embodiment, it suffices for the suspend display area to be an area including an abnormal display area.

Figure 11:
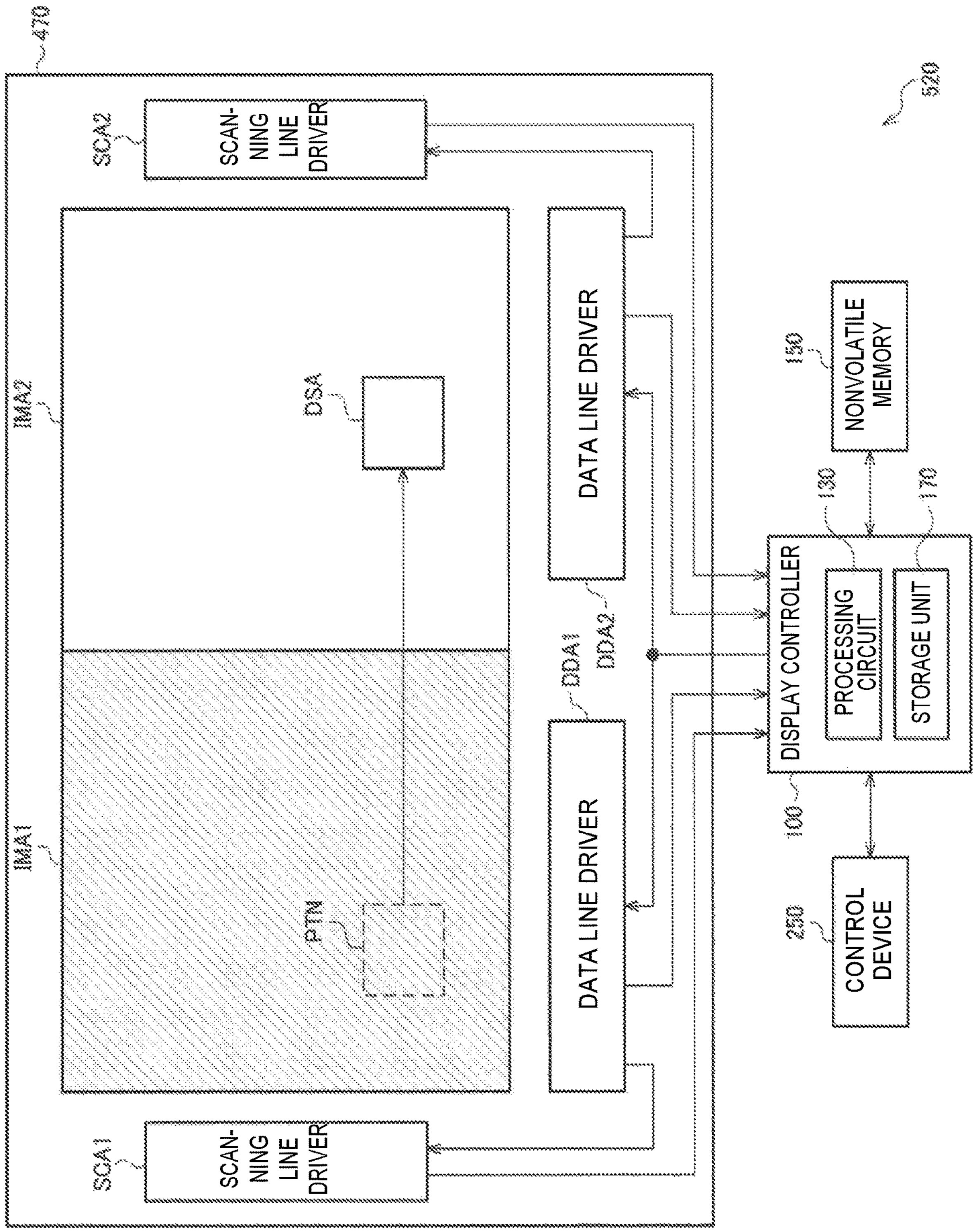
FIG. 11 is a diagram illustrating a third embodiment.

FIG. 11 is a diagram illustrating a third embodiment. In FIG. 11, the display area of one electro-optical panel is divided into IMA1 and IMA2. IMA1 is a display area driven by the data line driver DDA1, and IMA2 is a display area driven by the data line driver DDA2. In the third embodiment, an abnormal display line is an abnormal data line.

As shown in FIG. 11, the specific display pattern PTN is displayed in the display area IMA1, and the destination display area DSA is set in the display area IMA2. A technique in which the processing circuit 130 determines whether or not to move the specific display pattern PTN to the destination display area DSA is similar to the technique in the first embodiment. Accordingly, the storage unit 170 stores a fourth threshold value for making a determination on an abnormal display area. The number of abnormal data lines that overlap the specific display pattern PTN is denoted by N4, and the fourth threshold value is denoted by Th4. The processing circuit 130 determines whether or not N4>Th4. If N4>Th4, the processing circuit 130 determines to display the specific display pattern PTN in the destination display area DSA. At this time, the processing circuit 130 outputs image data for displaying the specific display pattern PTN in the destination display area DSA, to the data line driver DDA2, instead of the data line driver DDA1. In this embodiment, the data line driver DDA2 is a second display driver. Note that the technique for determining whether or not to move a display pattern based on the degree of importance of the display pattern, and the like can also be applied to the third embodiment, similarly to the first embodiment.

In FIG. 11, the processing circuit 130 sets, in a suspend display area, the entire display area IMA1 that is driven by the data line driver DDA1, and displays the suspend display area in white, black, or a specific color.

Figure 12:
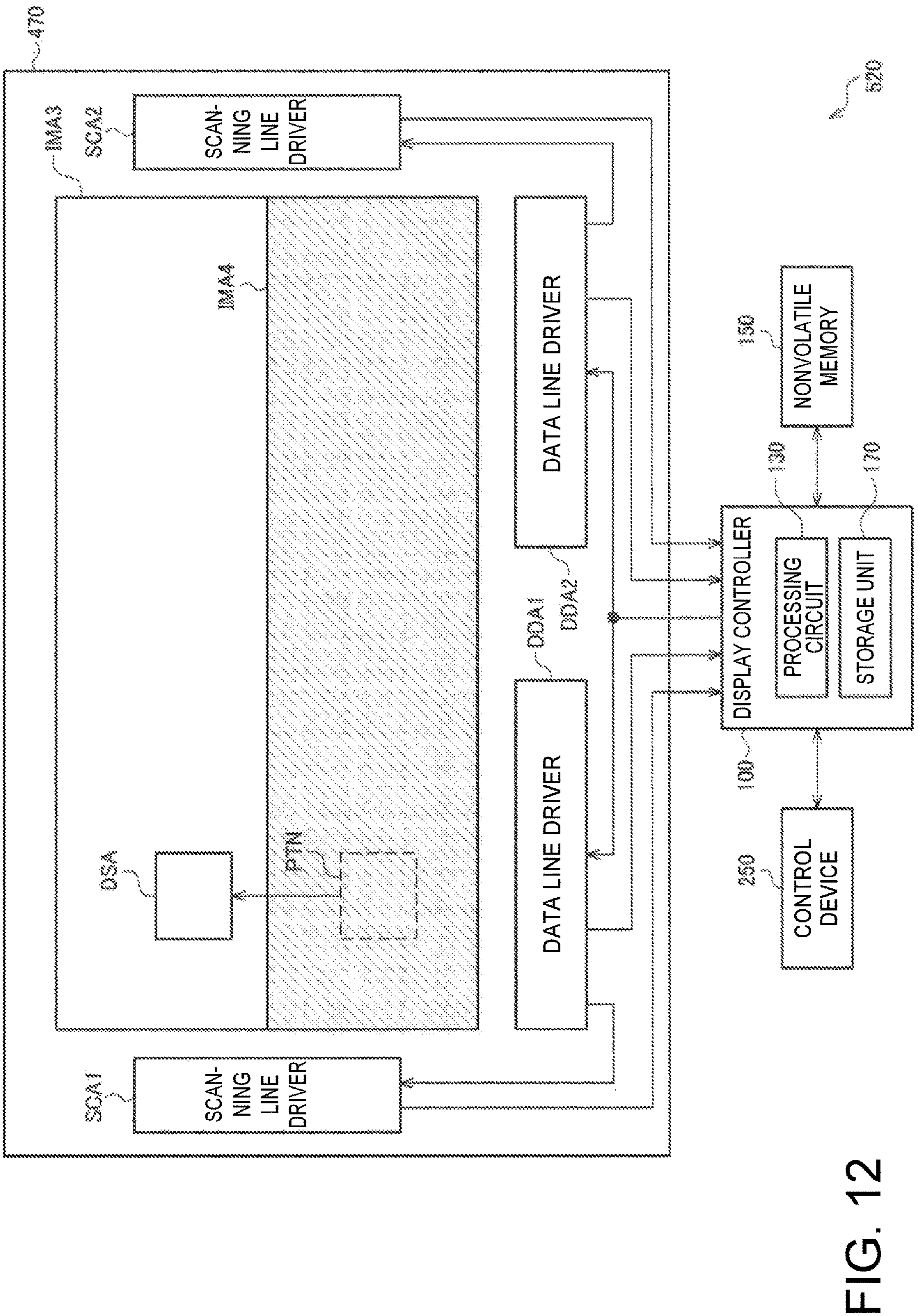
FIG. 12 is a diagram illustrating a fourth embodiment.

FIG. 12 is a diagram illustrating a fourth embodiment. In FIG. 12, the display area of one electro-optical panel is divided into IMA3 and IMA4. IMA3 is a display area driven by the scanning line driver SCA1, and IMA4 is a display area driven by the scanning line driver SCA2. In the fourth embodiment, an abnormal display line is an abnormal scanning line.

As shown in FIG. 12, the specific display pattern PTN is displayed in the display area IMA4, and the destination display area DSA is set in the display area IMA3. A technique in which the processing circuit 130 determines whether or not to move the specific display pattern PTN to the destination display area DSA is similar to the technique in the first embodiment. Accordingly, the storage unit 170 stores a fifth threshold value for making a determination on an abnormal display area. The number of abnormal data lines that overlap the specific display pattern PTN is denoted by N5, and the fifth threshold value is denoted by Th5. The processing circuit 130 determines whether or not N5>Th5. If N5>Th5, the processing circuit 130 determines to display the specific display pattern PTN in the destination display area DSA. Note that the technique for determining whether or not to move a display pattern based on the degree of importance of the display pattern, and the like can also be applied to the fourth embodiment, similarly to the first embodiment.

In FIG. 12, the processing circuit 130 sets, in a suspend display area, the entire display area IMA4 that is driven by the scanning line driver SCA2, and displays this suspend display area in white, black, or a specific color.

Figure 13:
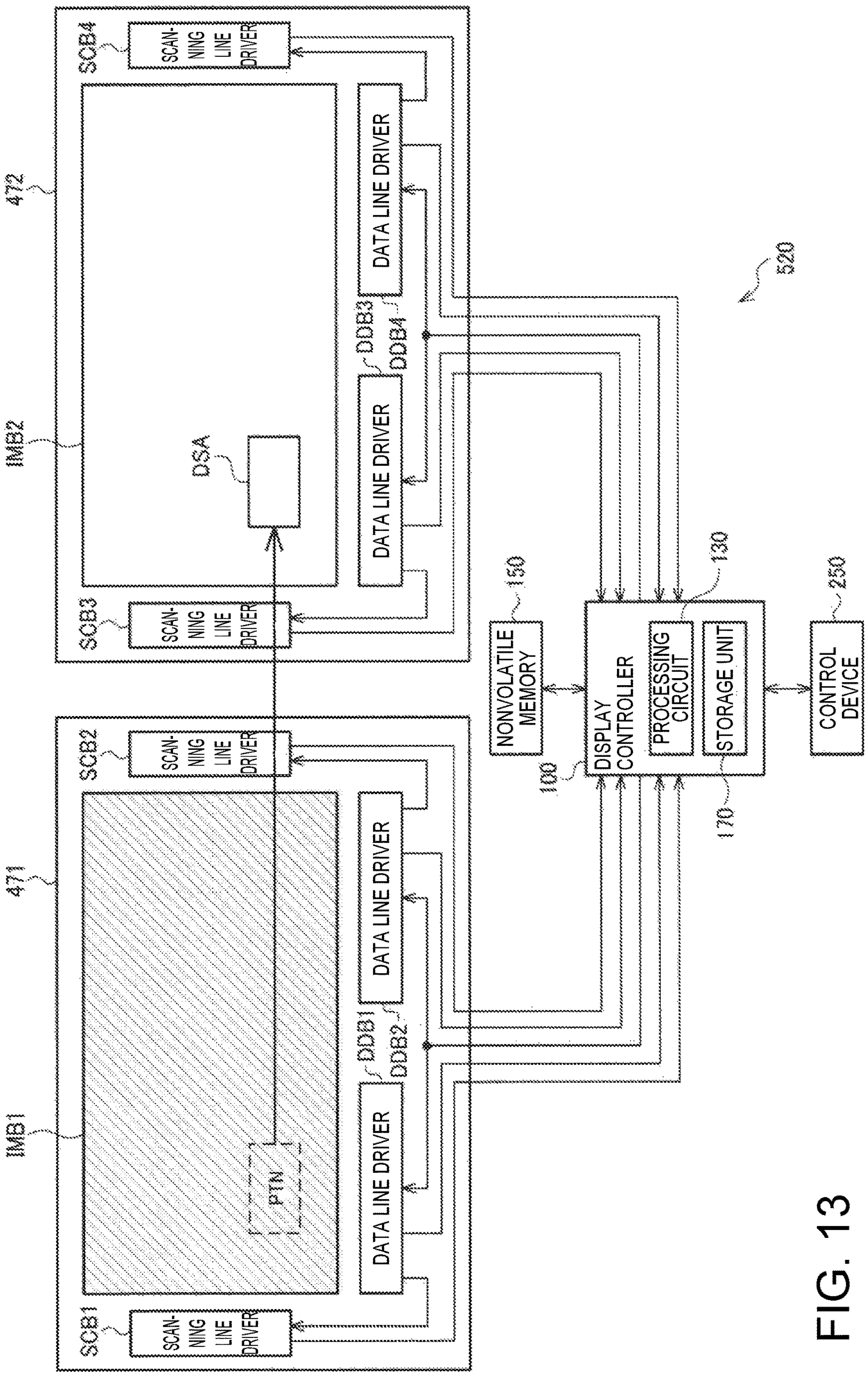
FIG. 13 is a diagram illustrating a fifth embodiment.

FIG. 13 is a diagram illustrating a fifth embodiment. As shown in FIG. 13, the display system 520 includes a panel module 471 and a panel module 472. The electro-optical panel of the panel module 471 is defined as a first electro-optical panel, and the electro-optical panel of the panel module 472 is defined as a second electro-optical panel. IMB1 denotes the display area of the first electro-optical panel, and IMB2 denotes the display area of the second electro-optical panel. Data line drivers DDB1 and DDB2 and scanning line drivers SCB1 and SCB2 drive the first electro-optical panel, and data line drivers DDB3 and DDB4 and scanning line drivers SCB3 and SCB4 drive the second electro-optical panel. In the fifth embodiment, an abnormal display line may be an abnormal data line or an abnormal scanning line.

As shown in FIG. 13, the specific display pattern PTN is displayed in the display area IMB1, and the destination display area DSA is set in the display area IMB2. A technique in which the processing circuit 130 determines whether or not to move the specific display pattern PTN to the destination display area DSA is similar to the technique in the first embodiment. Accordingly, the storage unit 170 stores a sixth threshold value for determining an abnormal display area. The number of abnormal data lines that overlap the specific display pattern PTN is denoted by N6, and the sixth threshold value is denoted by Th6. The processing circuit 130 determines whether or not N6>Th6. If N6>Th6, the processing circuit 130 determines to display the specific display pattern PTN in the destination display area DSA. At this time, the processing circuit 130 outputs image data for displaying the specific display pattern PTN in the destination display area DSA, to the data line drivers DDB3 and DDB4 that drive the second electro-optical panel, instead of the data line drivers DDB1 and DDB2 that drive the first electro-optical panel. In this embodiment, the data line driver DDB3 or DDB4 is a second display driver. If the destination display area DSA is in the display area that is driven by the data line driver DDB3, the data line driver DDB3 is a second display driver. If the destination display area DSA is in the display area that is driven by the data line driver DDB4, the data line driver DDB4 is a second display driver. Note that the technique for determining whether or not to move a display pattern based on the degree of importance of the display pattern, and the like can also be applied to the fifth embodiment, similarly to the first embodiment.

In FIG. 11, the processing circuit 130 sets the entire display area IMB1 of the first electro-optical panel in a suspend display area, and displays the suspend display area in white, black or a specific color.

4. Error Detection Circuit

Figure 14:
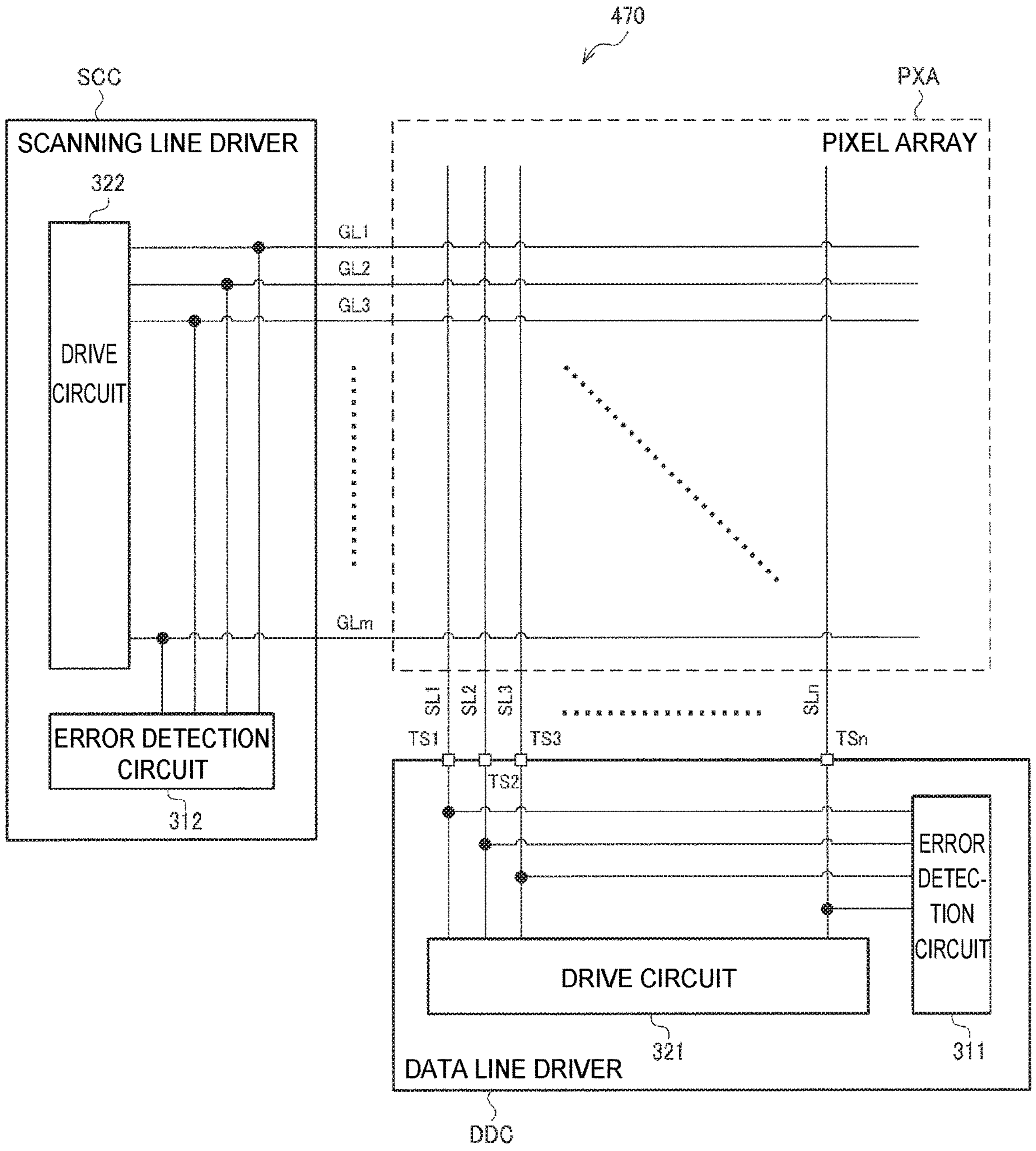
FIG. 14 shows a detailed configuration example of a panel module.

Next, a detailed configuration example of an error detection circuit will be described. FIG. 14 shows a detailed configuration example of the panel module 470. Note that a case will be described in which an electro-optical panel is driven by one data line driver and one scanning line driver, as an example, with reference to FIG. 14. If an electro-optical panel is driven by a plurality of data line drivers or a plurality of scanning line drivers, similar error detection circuits are provided for the respective drivers.

As shown in FIG. 14, the panel module 470 includes a pixel array PXA, data lines SL1 to SLn connected to the pixel array PXA, scanning lines GL1 to GLm connected to the pixel array PXA, a data line driver DDC, and a scanning line driver SCC. "n" and "m" are each an integer of 2 or larger. FIG. 14 does not show the pixels of the pixel array PXA, but the pixels are respectively connected to the intersections between the data lines SL1 to SLn and the scanning lines GL1 to GLm.

The pixel array PXA, the data lines SL1 to SLn, the scanning lines GL1 to GLm, and the scanning line driver SCC are formed on a glass substrate. The data line driver DDC is an integrated circuit device, which is mounted on the glass substrate to connect terminals TS1 to TSn to the data lines SL1 to SLn on the glass substrate. Note that the scanning line driver SCC may also be constituted by an integrated circuit device. In addition, the data line driver DDC and the scanning line driver SCC may also be configurated as one integrated circuit device.

The data line driver DDC includes a drive circuit 321 that drives the data lines SL1 to SLn via the terminals TS1 to TSn, and an error detection circuit 311 connected to the terminals TS1 to TSn. The error detection circuit 311 detects an abnormal data line based on a voltage that is output by the data line driver DDC. Specifically, when a voltage other than a data voltage to be originally applied to a data line is applied to the data line, the error detection circuit 311 determines the data line as an abnormal data line. For example, an abnormality in the drive circuit 321, a contact failure between the terminals TS1 to TSn, or short-circuiting of the data lines SL1 to SLn can be envisioned as a factor that causes an abnormal data line.

The scanning line driver SCC includes a drive circuit 322 that drives the scanning lines GL1 to GLm and an error detection circuit 312 connected to the scanning lines GL1 to GLm. The error detection circuit 312 detects an abnormal scanning line based on a voltage that is output by the scanning line driver SCC. Specifically, when a voltage other than a scanning line driving voltage to be originally applied to a scanning line is applied to the scanning line, the error detection circuit 312 determines the scanning line as an abnormal scanning line. For example, an abnormality in the drive circuit 322 and short-circuiting in the scanning lines GL1 to GLm can be envisioned as factors that cause an abnormal scanning line. In addition, if the scanning line driver SCC is an integrated circuit device, a contact failure between terminals can be further envisioned as a factor that causes an abnormal scanning line.

Figure 15:
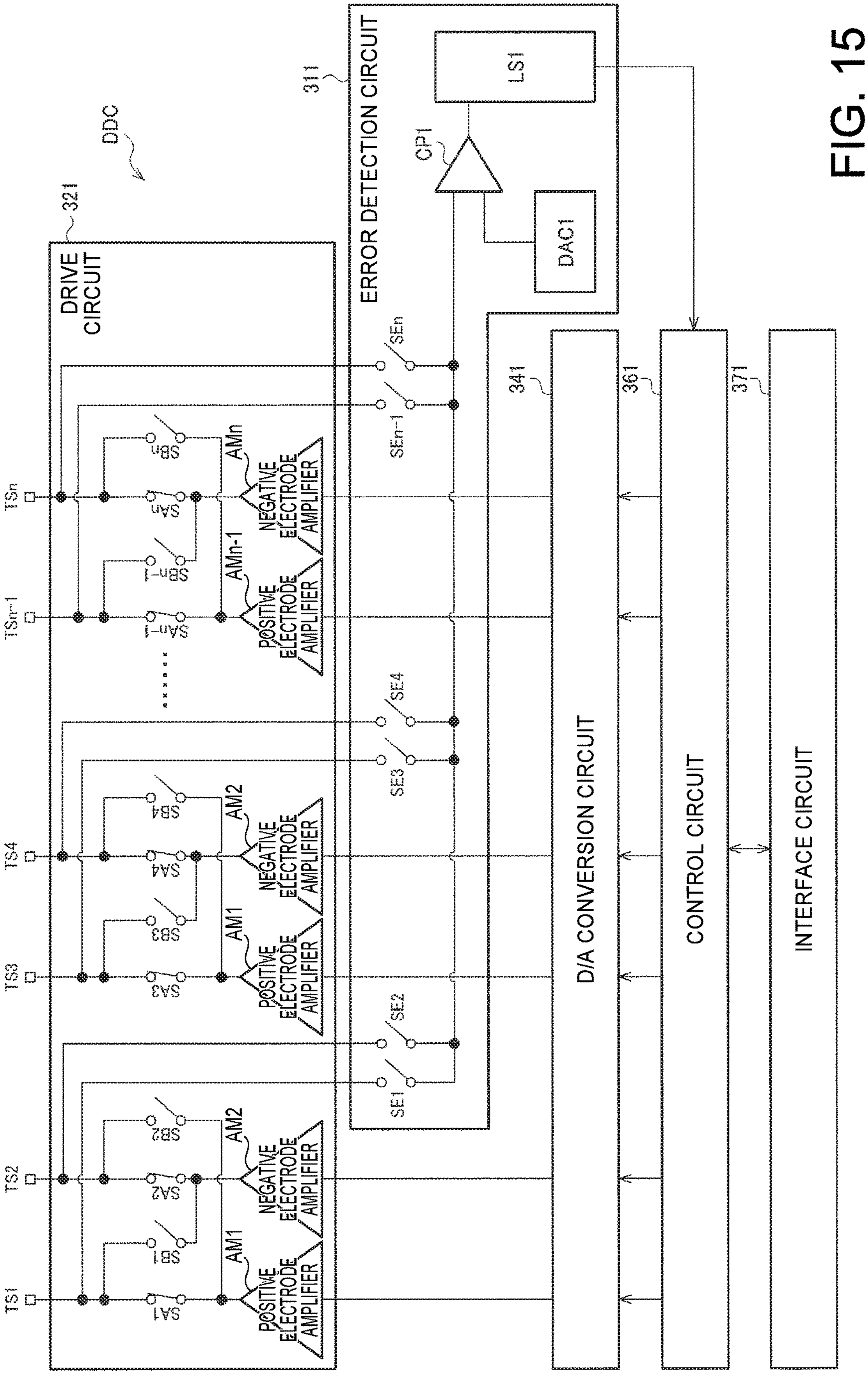
FIG. 15 shows a detailed configuration example of a data line driver.

FIG. 15 is a detailed configuration example of a data line driver DDC. The data line driver DDC includes the error detection circuit 311, the drive circuit 321, a D/A conversion circuit 341, a control circuit 361, an interface circuit 371, and the terminals TS1 to TSn.

The interface circuit 371 receives image data and a timing control signal from the display controller 100. The control circuit 361 outputs pixel data to the D/A conversion circuit 341 based on the image data and timing control signal received by the interface circuit 371. The pixel data is image data corresponding to a data voltage that is written to the pixels. The D/A conversion circuit 341 D/A-converts the pixel data into a data voltage. The drive circuit 321 amplifies the data voltage from the D/A conversion circuit 341, and outputs the amplified data voltage to the terminals TS1 to TSn.

The drive circuit 321 includes amplifier circuits AM1 to AMn, switches SA1 to SAn, and switches SB1 to SBn.

The amplifier circuits AM1 to AMn amplify a data voltage from the D/A conversion circuit 341. The amplifier circuits AM1, AM3, . . . , AMn-1 are positive electrode amplifiers that output a positive electrode data voltage in polarity inversion driving. The amplifier circuits AM2, AM4, . . . , AMn are negative electrode amplifiers that output a negative electrode data voltage in polarity inversion driving. Here, "n" is an even number.

The switches SA1 to SAn and SB1 to SBn are each constituted by a transistor, for example. A state where the switches SA1 to SAn are on and the switches SB1 to SBn are off is defined as a first state, and a state where the switches SA1 to SAn are off and the switches SB1 to SBn are on is defined as a second state. In the first state, the output nodes of the amplifier circuits AM1, AM3, . . . , AMn-1, which are positive electrode amplifiers, are connected to the terminals TS1, TS3, . . . , TSn-1, and the output nodes of the amplifier circuits AM2, AM4, . . . , AMn, which are negative electrode amplifiers, are connected to the terminals TS2, TS4, . . . , TSn. In the second state, the output nodes of the amplifier circuits AM1, AM3, . . . , AMn-1, which are positive electrode amplifiers, are connected to the terminals TS2, TS4, . . . , TSn, and the output nodes of the amplifier circuits AM2, AM4, . . . , AMn, which are negative electrode amplifiers, are connected to the terminals TS1, TS3, . . . , TSn-1. As a result of the control circuit 361 alternately switching the first state and the second state, polarity inversion driving is performed.

The error detection circuit 311 includes switches SE1 to SEn, a D/A conversion circuit DAC1, a comparator CP1, and a level shifter LS1.

The switches SE1 to SEn are each constituted by a transistor, for example. When the switch SE1 is on, the switches SE2 to SEn are off. At this time, the comparator CP1 compares a voltage in the terminal TS1 that is input via the switch SE1 with an output voltage of the D/A conversion circuit DAC1. The level shifter LS1 level-shifts the output signal level of the comparator CP1 to the signal level of the control circuit 361, which is a logic circuit, and outputs the level-shifted signal to the control circuit 361. The D/A conversion circuit DAC1 outputs a voltage for determining whether or not the voltage in the terminal TS1 is normal. As a result of this output voltage of the D/A conversion circuit DAC1 being compared with the voltage in the terminal TS1 by the comparator CP1, a determination is made as to whether or not the voltage in the terminal TS1 is normal. If it is determined that the voltage in the terminal TS1 is abnormal, the control circuit 361 determines that the data line SL1 connected to the terminal TS1 is an abnormal display line.

Similarly, when the switch SE2 is on, the switches SE1, SE3 to SEn are off. The control circuit 361 determines, based on a detection result of the error detection circuit 311, whether or not the data line SL2 is an abnormal display line. From this point on, the switches SE3 to SEn are sequentially switched on one by one, and the control circuit 361 determines, based on a detection result of the error detection circuit 311, whether or not the data lines SL3 to SLn are abnormal display lines. The control circuit 361 outputs abnormal display line detection information to the display controller 100 via the interface circuit 371, based on the detection result of abnormal display lines.

Figure 16:
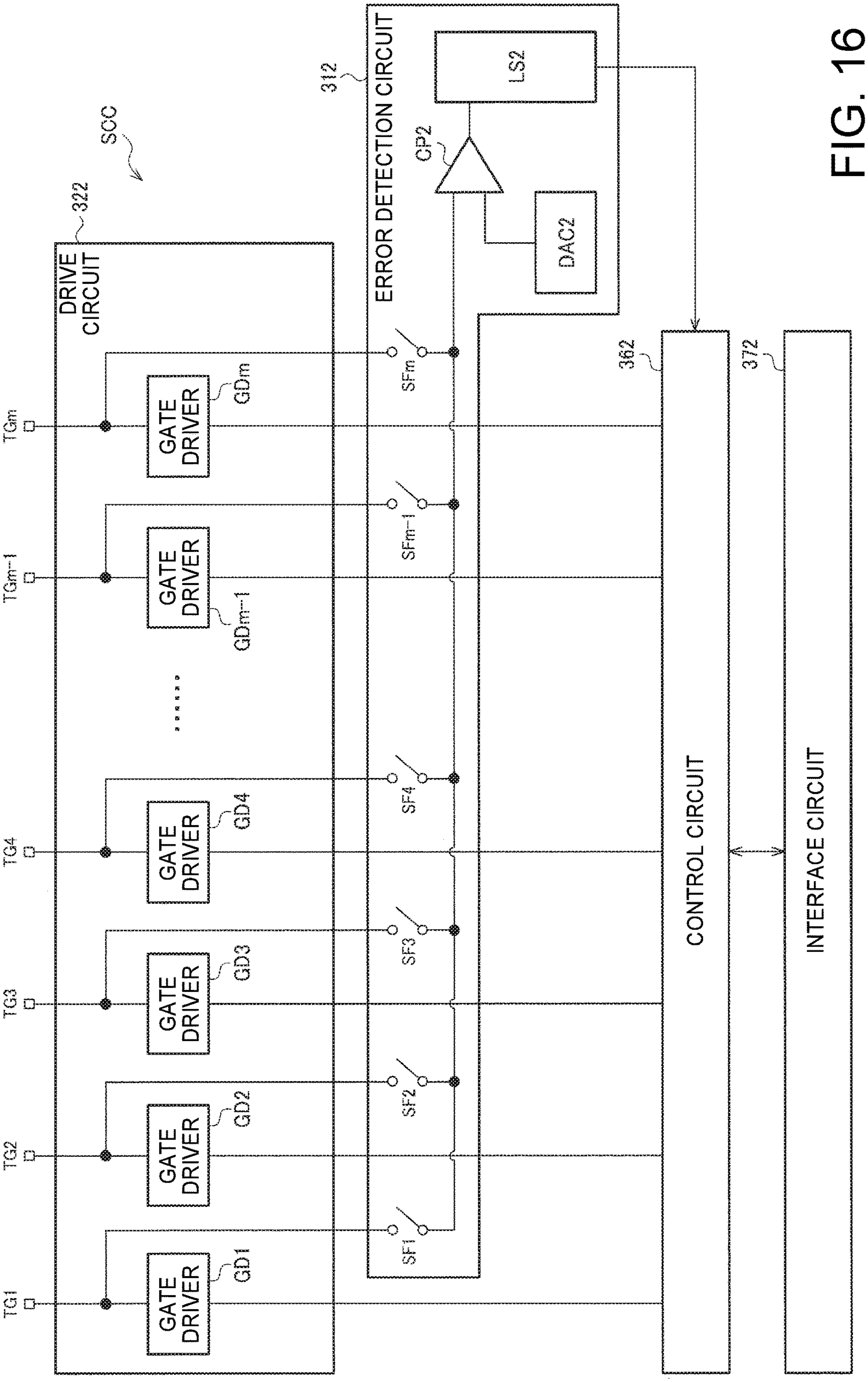
FIG. 16 shows a detailed configuration example of a scanning line driver.

FIG. 16 shows a detailed configuration example of the scanning line driver SCC. FIG. 16 shows an example in a case where the scanning line driver SCC is constituted by an integrated circuit device. The scanning line driver SCC includes the error detection circuit 312, the drive circuit 322, a control circuit 362, an interface circuit 372, and terminals TG1 to TGm. The terminals TG1 to TGm are connected to scanning lines GL1 to GLm on the glass substrate.

The interface circuit 372 receives, from the display controller 100, a timing control signal for controlling scanning line selection. The control circuit 362 outputs a gate drive signal to the drive circuit 322 based on the timing control signal received by the interface circuit 372. The drive circuit 322 amplifies the gate drive signal from the control circuit 362, and outputs the amplified gate drive signal to the terminals TG1 to TGm.

The drive circuit 322 includes gate drivers GD1 to GDm. The gate drivers GD1 to GDm amplify a gate drive signal from the control circuit 362, and output the amplified gate drive signal to the terminals TG1 to TGm.

The error detection circuit 312 includes switches SF1 to SFm, a D/A conversion circuit DAC2, a comparator CP2, and a level shifter LS2.

The switches SF1 to SFm are each constituted by a transistor, for example. When the switch SF1 is on, the switches SF2 to SFm are off. At this time, the comparator CP2 compares a voltage in the terminal TG1 that is input via the switch SF1 with an output voltage of the D/A conversion circuit DAC2. The level shifter LS2 level-shifts the output signal level of the comparator CP2 to the signal level of the control circuit 362, which is a logic circuit, and outputs the level-shifted signal to the control circuit 362. The D/A conversion circuit DAC2 outputs a voltage for determining whether or not a voltage in the terminal TG1 is normal. As a result of this output voltage of the D/A conversion circuit DAC2 being compared with the voltage in the terminal TG1 by the comparator CP2, a determination is made as to whether or not the voltage in the terminal TG1 is normal. If it is determined that the voltage in the terminal TG1 is abnormal, the control circuit 362 determines that the scanning line GL1 connected to the terminal TG1 is an abnormal display line.

Similarly, when the switch SF2 is on, the switches SF1, SF3 to SFm are off. The control circuit 362 determines whether or not the scanning line GL2 is an abnormal display line based on a detection result of the error detection circuit 312. From this point on, the switches SF3 to SFm are sequentially switched on one by one, and the control circuit 362 determines, based on a detection result of the error detection circuit 312, whether or not the scanning lines GL3 to GLm are abnormal display lines. The control circuit 362 outputs abnormal display line detection information to the display controller 100 via the interface circuit 372, based on the detection result of abnormal display line.

5. Electronic Apparatus and Mobile Unit

Figure 17:
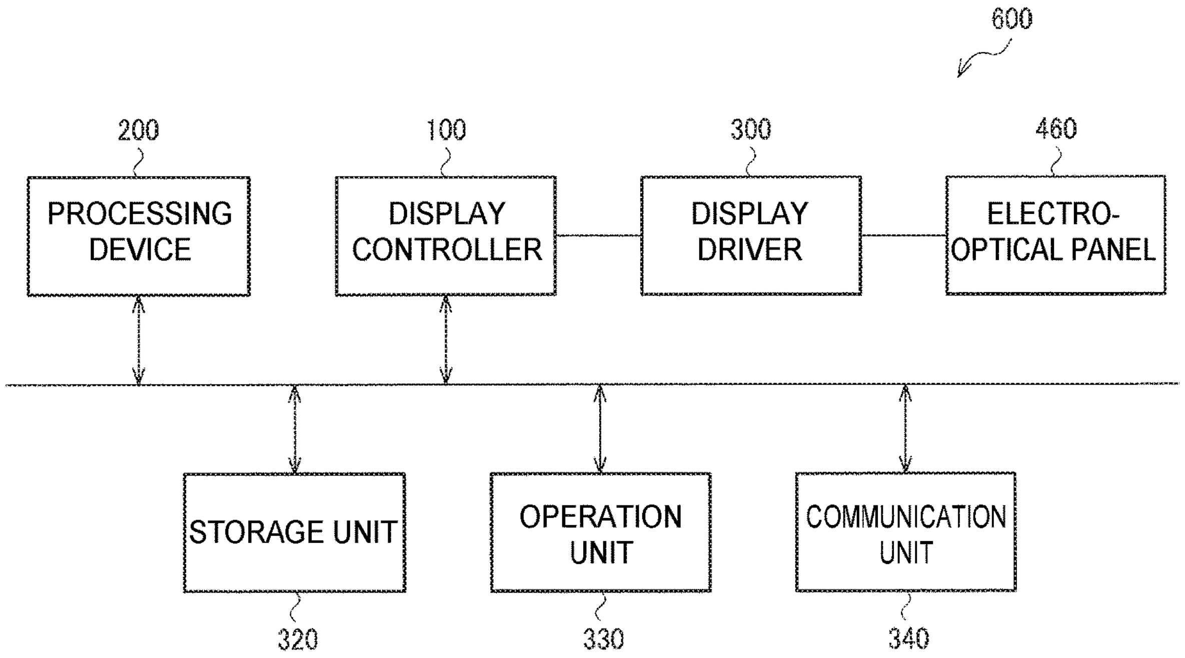
FIG. 17 shows a configuration example of an electronic apparatus.

FIG. 17 shows a configuration example of an electronic apparatus that includes the display controller of the present embodiment. The electronic apparatus of the present embodiment may be any of various electronic apparatuses equipped with a display device. For example, the electronic apparatus of the present embodiment may be an on-board display device, a display, a projector, a television device, an information processing device, a portable information terminal, a car navigation system, a portable game terminal, a DLP (digital light processing) device, or the like. The on-board display device is a meter panel or the like.

An electronic apparatus 600 includes the processing device 200, the display controller 100, the display driver 300, the electro-optical panel 460, a storage unit 320, an operation unit 330, and a communication unit 340. Note that the storage unit 320 is a storage device or a memory. The operation unit 330 is an operation device. The communication unit 340 is a communication device.

The operation unit 330 is a user interface that receives various operations from the user. The operation unit 330 may be composed of, for example, buttons, a mouse, a keyboard, and a touch panel attached to the electro-optical panel 460. The communication unit 340 is a data interface that communicates image data and control data. The communication unit 340 is, for example, a wired communication interface such as a USB or a wireless communication interface such as a wireless LAN. The storage unit 320 stores image data that has been input from the communication unit 340. Alternatively, the storage unit 320 functions as a working memory of the processing device 200. The processing device 200 performs control processing of the units of the electronic apparatus and various types of data processing. The display controller 100 performs control processing of the display driver 300. For example, the display controller 100 converts image data transferred from the communication unit 340 or the storage unit 320 via the processing device 200, into a format that can be accepted in the display driver 300, and outputs the converted image data to the display driver 300. The display driver 300 drives the electro-optical panel 460 based on the image data transferred from the display controller 100.

Figure 18:
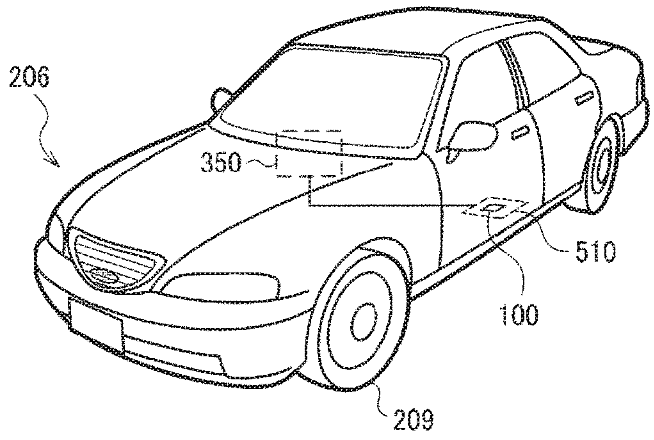
FIG. 18 shows an example of a mobile unit.

FIG. 18 shows a configuration example of a mobile unit that includes the display controller according to the present embodiment. The mobile unit is a device or an apparatus that moves on ground, in the air, or on sea, and includes, for example, a driving mechanism such as an engine or a motor, a steering mechanism such as a steering wheel or a rudder, and various types of electronic apparatuses. The mobile unit according to the present embodiment may be, for example, any of various mobile units such as a vehicle, an aircraft, a motorcycle, a marine vessel, a running robot, and a walking robot. FIG. 18 schematically shows an automobile 206 that is a specific example of the mobile unit. The automobile 206 includes a display device 350 and a control device 510 that controls the units of the automobile 206. The display controller 100 of the present embodiment is implemented on the substrate of a control device 510, for example. Alternatively, the display controller 100 of the present embodiment may be included in the display device 350. The control device 510 generates an image for presenting, to the user, information such as a vehicle speed, a fuel residual amount, a running distance, and settings of various devices, transmits the image to the display device 350, and displays the image on the electro-optical panel.

According to the above embodiments, a display controller includes an interface circuit that receives abnormal display line detection information from a display driver that drives an electro-optical panel having a display line for image display, and a processing circuit that controls the display driver. The processing circuit determines an abnormal display area based on the abnormal display line detection information. If a specific display pattern is displayed in the abnormal display area, the processing circuit outputs, via the interface circuit, image data for displaying the specific display pattern in a destination display area that is a display area different from the abnormal display area.

With such a configuration, when a specific display pattern is displayed in an abnormal display area, the specific display pattern is displayed in a destination display area. Specifically, if a portion of a display area that is driven by the display driver is an abnormal display area, a specific display pattern that is displayed in the abnormal display area can be moved to a destination display area. Accordingly, a normal display area can be used while maintaining the normal display area as much as possible.

In addition, in this embodiment, the processing circuit may determine the number of abnormal display lines based on the abnormal display line detection information, and determine whether or not to display the specific display pattern in the destination display area, based on a determination result regarding the number of abnormal display lines.

With such a configuration, whether or not to display the specific display pattern in the destination display area can be determined based on the number of abnormal display lines detected by the display driver. By using the number of abnormal display lines for the determination, a determination can be made as to whether or not a portion of a display area that is driven by the display driver, instead of the entire display area, is an abnormal display area.

In addition, in this embodiment, the processing circuit may determine whether or not to display the specific display pattern in the destination display area, based on the number of abnormal display lines in the specific display pattern and the number of abnormal display lines in the destination display area.

By using the number of abnormal display lines in the specific display pattern, a determination can be made as to whether or not the specific display pattern is displayed in the abnormal display area. If the specific display pattern is displayed in the abnormal display area, a determination can be made to display the specific display pattern in the destination display area. In addition, by using the number of abnormal display lines in the destination display area, a determination can be made as to whether or not the destination display area overlaps the abnormal display area. A determination can be made as to whether or not to display the specific display pattern in the destination display area, based on the determination result.

In addition, in this embodiment, the display controller may include a storage unit that stores a first threshold value for determining the abnormal display area. The processing circuit may compare the number of abnormal display lines in the specific display pattern with the first threshold value, and determine whether or not to display the specific display pattern in the destination display area, based on a result of the comparison.

With such a configuration, if the number of abnormal display lines in the specific display pattern is larger than the first threshold value, it can be determined that the specific display pattern is displayed in the abnormal display area. Accordingly, if the number of abnormal display lines in the specific display pattern is larger than the first threshold value, a determination can be made to display the specific display pattern in the destination display area.

In addition, in this embodiment, the storage unit may store a second threshold value for determining whether or not to enable display in the destination display area. If the number of abnormal display lines in the specific display pattern is larger than the first threshold value, the processing circuit may compare the number of abnormal display lines in the destination display area with the second threshold value. If the number of abnormal display lines in the destination display area is smaller than the second threshold value, the processing circuit may determine to display the specific display pattern in the destination display area.

With such a configuration, if the number of abnormal display lines in the destination display area is larger than the second threshold value, it can be determined that the destination display area overlaps the abnormal display area. Accordingly, if the number of abnormal display lines in the destination display area is smaller than or equal to the second threshold value, a determination can be made to display the specific display pattern in the destination display area.

In addition, in this embodiment, the processing circuit may determine whether or not to display the specific display pattern in the destination display area, based on the number of abnormal display lines in a specific area that is a portion of the specific display pattern.

With such a configuration, whether or not to display the specific display pattern in the destination display area can be determined based on the number of abnormal display lines in a portion of the specific display pattern, not the entire specific display pattern. For example, if a portion that is important to visually recognizing the specific display pattern overlaps an abnormal display line, the specific display pattern can be displayed in the destination display area.

In addition, in this embodiment, the specific display pattern may include a first specific display pattern for which a first degree of importance is set and a second specific display pattern for which a second degree of importance that is lower than the first degree of importance is set. The display controller may include a storage unit that stores degree-of-importance information that indicates the first degree of importance and the second degree of importance. When the first specific display pattern is displayed in the abnormal display area, the processing circuit may determine whether or not to move the first specific display pattern to the destination display area, based on the first threshold value set according to the first degree of importance. When the second specific display pattern is displayed in the abnormal display area, the processing circuit may determine whether or not to move the second specific display pattern to the destination display area, based on the second threshold set according to the second degree of importance.

With such a configuration, a determination as to whether or not to move the specific display pattern to the destination display area can be made according to the degree of importance of the display pattern. Specifically, a threshold value is set according to the degree of importance, and, by comparing the threshold value with the number of abnormal display lines, a determination can be made as to whether or not to move the specific display pattern to the destination display area. For example, the first threshold value that is set according to the first degree of importance is set to a value larger than the second threshold value that is set according to the second degree of importance. Accordingly, the first specific display pattern with a higher degree of importance is more likely to be determined to be moved to the destination display area than the second specific display pattern.

In addition, in this embodiment, the processing circuit may output, via the interface circuit, image data for displaying an area that includes the abnormal display area, in white, black, or a specific color.

With such a configuration, the area that includes the abnormal display area can be displayed in white, black, or a specific color. In addition, when the specific display pattern is displayed in the abnormal display area, it is possible to move the specific display pattern to the destination display area, and display the area that includes the abnormal display area, in white, black, or a specific color.

In addition, in this embodiment, the abnormal display line detection information may be detection information regarding an abnormal data line or an abnormal scanning line in the electro-optical panel.

With such a configuration, the number of abnormal data lines is determined based on the abnormal display line detection information, and whether or not to display the specific display pattern in the destination display area can be determined based on the determination result regarding the number of abnormal data lines. Alternatively, the number of abnormal scanning lines is determined based on the abnormal display line detection information, and whether or not to display the specific display pattern in the destination display area can be determined based on the determination result regarding the number of abnormal scanning lines.

In addition, in this embodiment, the processing circuit may output the image data for displaying the specific display pattern in the destination display area, to the display driver via the interface circuit.

In this case, the specific display pattern and the destination display area are in a display area that is driven by the same display driver. Then, if the specific display pattern is displayed in the abnormal display area, the processing circuit outputs the image data for displaying the specific display pattern in the destination display area, to the display driver via the interface circuit.

In addition, in this embodiment, the processing circuit may control a second display driver that drives the electro-optical panel. The processing circuit may output the image data for displaying the specific display pattern in the destination display area, to the second display driver via the interface circuit.

In this case, one electro-optical panel is driven by the display driver and the second display driver. The specific display pattern is in a display area that is driven by the display driver, and the destination display area is in a display area that is driven by the second display driver. Then, if the specific display pattern is displayed in the abnormal display area, the processing circuit outputs the image data for displaying the specific display pattern in the destination display area, to the second display driver via the interface circuit.

In addition, in this embodiment, the processing circuit may control a second display driver that drives a second electro-optical panel. The processing circuit may output the image data for displaying the specific display pattern in the destination display area, to the second display driver via the interface circuit.

In this case, a first electro-optical panel is driven by the display driver, and the second electro-optical panel is driven by the second display driver. The specific display pattern is in the display area of the first electro-optical panel, and the destination display area is in the display area of the second electro-optical panel. Then, if the specific display pattern is displayed in the abnormal display area, the processing circuit outputs the image data for displaying the specific display pattern in the destination display area, to the second display driver via the interface circuit.

In addition, in this embodiment, a display control system includes the above-described display controller and display driver.

In addition, in this embodiment, an electro-optical device includes the above-described display controller, electro-optical panel, and display driver.

In addition, in this embodiment, an electronic apparatus includes the above-described display controller.

In addition, in this embodiment, a mobile unit includes the above-described display controller.

The embodiments according to the disclosure have been described in detail above, but those skilled in the art will readily understand that various modifications can be made from new matter and effects of the disclosure without departing from the gist of the disclosures. Accordingly, all of such modifications are also encompassed in the scope of the disclosure. For example, a term described together with a different term having a broader meaning or the same meaning at least once in the specification or drawings may be replaced by the different term anywhere in the specification or drawings. Also, all combinations of the embodiments and variations of the disclosure are also encompassed in the scope of the disclosure. In addition, the configurations and operations of the display controller, the electro-optical panel, the display control system, the electro-optical device, the display system, the electronic apparatus, and the mobile unit are not limited to those described in the embodiments of the disclosure, and various modifications can be made thereto.

What is claimed is:

1. A display controller comprising:

an interface circuit that receives abnormal display line detection information from a display driver that drives an electro-optical panel having a display line for image display;

a processing circuit that controls the display driver; and a storage unit that stores a first threshold value for determining an abnormal display area, wherein the processing circuit determines the abnormal display area based on the abnormal display line detection information, and if a specific display pattern is displayed in the abnormal display area, outputs, via the interface circuit, image data for displaying the specific display pattern in a destination display area that is a display area different from the abnormal display area, the specific display pattern comprises portions of a plurality of data lines, the processing circuit determines the number of abnormal display lines based on the abnormal display line detection information, and determines whether or not to display the specific display pattern in the destination display area, based on a determination result regarding the number of abnormal display lines, the processing circuit compares the number of abnormal display lines in the specific display pattern with the first threshold value, and determines whether or not to display the specific display pattern in the destination display area, based on a result of the comparison, the specific display pattern includes a first specific display pattern for which a first degree of importance is set and a second specific display pattern for which a second degree of importance that is lower than the first degree of importance is set, the display controller includes a storage unit that stores degree-of-importance information that indicates the first degree of importance and the second degree of importance, and when the first specific display pattern is displayed in the abnormal display area, the processing circuit determines whether or not to move the first specific display pattern to the destination display area, based on the first threshold value set according to the first degree of importance, and when the second specific display pattern is displayed in the abnormal display area, the processing circuit determines whether or not to move the second specific display pattern to the destination display area, based on the second threshold set according to the second degree of importance.

2. The display controller according to claim 1, wherein the processing circuit determines whether or not to display the specific display pattern in the destination display area, based on the number of abnormal display lines in the specific display pattern and the number of abnormal display lines in the destination display area.

3. The display controller according to claim 1, wherein the storage unit stores a second threshold value for determining whether or not to enable display in the destination display area, and if the number of abnormal display lines in the specific display pattern is larger than the first threshold value, the processing circuit compares the number of abnormal display lines in the destination display area with the second threshold value, and if the number of abnormal display lines in the destination display area is smaller than the second threshold value, determines to display the specific display pattern in the destination display area.

4. The display controller according to claim 1, wherein the processing circuit determines whether or not to display the specific display pattern in the destination display area, based on the number of abnormal display lines in a specific area that is a portion of the specific display pattern.

5. The display controller according to claim 1, wherein the processing circuit outputs, via the interface circuit, image data for displaying an area that includes the abnormal display area, in white, black, or a specific color.

6. The display controller according to claim 1, wherein the abnormal display line detection information is detection information regarding an abnormal data line or an abnormal scanning line in the electro-optical panel.

7. The display controller according to claim 1, wherein the processing circuit outputs the image data for displaying the specific display pattern in the destination display area, to the display driver via the interface circuit.

8. The display controller according to claim 1, wherein the processing circuit controls a second display driver that drives the electro-optical panel, and the processing circuit outputs the image data for displaying the specific display pattern in the destination display area, to the second display driver via the interface circuit.

9. The display controller according to claim 1, wherein the processing circuit controls a second display driver that drives a second electro-optical panel, and the processing circuit outputs the image data for displaying the specific display pattern in the destination display area, to the second display driver via the interface circuit.

10. A display control system comprising:

the display controller according to claim 1; and the display driver.

11. An electro-optical device comprising:

the display controller according to claim 1;

the electro-optical panel; and the display driver.

12. An electronic apparatus comprising the display controller according to claim 1.

13. A mobile unit comprising the display controller according to claim 1.

* * * * *